(12) United States Patent
Birdwell et al.

(10) Patent No.: US 7,640,223 B2
(45) Date of Patent: *Dec. 29, 2009

(54) METHOD OF ORGANIZING AND PRESENTING DATA IN A TABLE USING STUTTER PEAK RULE

(75) Inventors: John Douglas Birdwell, Oak Ridge, TN (US); Tse-Wei Wang, Oak Ridge, TN (US); Dale V. Stansberry, Knoxville, TN (US); Jared Pendleton, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 291 days.

This patent is subject to a terminal disclaimer.

(21) Appl. No.: 11/560,566

(22) Filed: Nov. 16, 2006

(65) Prior Publication Data

US 2008/0276162 A1   Nov. 6, 2008

(51) Int. Cl.
G06F 15/18   (2006.01)
(52) U.S. Cl. ............................................. 706/47
(58) Field of Classification Search ............ None
See application file for complete search history.

(56) References Cited

U.S. PATENT DOCUMENTS

| 5,121,443 A | 6/1992 | Tomlinson |
| 5,161,204 A | 11/1992 | Hutcheson et al. |
| 5,273,632 A | 12/1993 | Stockham et al. |
| 5,325,466 A | 6/1994 | Kornacker |
| 5,374,527 A | 12/1994 | Grossman |
| 5,442,562 A | 8/1995 | Hopkins et al. |
| 5,470,710 A | 11/1995 | Weiss et al. |
| 5,541,067 A | 7/1996 | Perlin |

(Continued)

FOREIGN PATENT DOCUMENTS

| WO | 99/53423 | 10/1999 |
| WO | 9953423 | 10/1999 |

OTHER PUBLICATIONS

Novel algorithm for automated genotyping of microsatellites, Toshiko Matsumoto, Wataru Yukawa, Yasuyuki Nozaki, Ryo Nakashige, Minori Shinya, 1,3 Satoshi Makino,3 Masaru Yagura,3 Tomoki Ikuta,1,3 Tadashi Imanishi,4 Hidetoshi Inoko,1,3,4 Gen Tamiya,1,3 and Takashi Gojobori, Nucleic Acids Res. 2004; 32(20): 6069-6077. Published online Nov. 1, 2004.*

(Continued)

*Primary Examiner*—David R Vincent
*Assistant Examiner*—Ola Olude-Afolabi
(74) *Attorney, Agent, or Firm*—PCT Law Group, PLLC; Thomas H. Jackson

(57) ABSTRACT

An item is organized and presented by displaying a table, wherein the table displays a plurality of data comprising analysis results characterizing the at least one item, and wherein an analysis result is based on a decision made by an expert system according to a rule base. Input is accepted from a source, wherein the input may cause the analysis results to be modified, and wherein the results may be modified by re-applying the rule base. In response to the input, an updated table is created, wherein the updated table comprises the modified analysis results. This updated table is then displayable.

32 Claims, 20 Drawing Sheets

U.S. PATENT DOCUMENTS

| | | | |
|---|---|---|---|
| 5,559,940 | A | 9/1996 | Hutson |
| 5,580,728 | A | 12/1996 | Perlin |
| 5,759,369 | A | 6/1998 | Menchen et al. |
| 5,761,685 | A | 6/1998 | Hutson |
| 5,813,005 | A | 9/1998 | Tsuchida et al. |
| 5,876,933 | A | 3/1999 | Perlin |
| 5,884,320 | A | 3/1999 | Agrawal et al. |
| 5,926,812 | A | 7/1999 | Hilsenrath et al. |
| 6,026,397 | A | 2/2000 | Sheppard |
| 6,054,268 | A | 4/2000 | Perlin |
| 6,100,901 | A | 8/2000 | Mohda et al. |
| 6,122,628 | A | 9/2000 | Castelli et al. |
| 6,134,541 | A | 10/2000 | Castelli et al. |
| 6,438,499 | B1 | 8/2002 | Hayashi |
| 6,490,582 | B1 | 12/2002 | Fayyad et al. |
| 6,598,054 | B2 | 7/2003 | Schuetze et al. |
| 6,741,983 | B1 | 5/2004 | Birdwell et al. |
| 6,750,011 | B1 | 6/2004 | Perlin |
| 6,807,490 | B1 | 10/2004 | Perlin |
| 2002/0086289 | A1 | 7/2002 | Straus |
| 2002/0116135 | A1 | 8/2002 | Pasika et al. |
| 2002/0152035 | A1 | 10/2002 | Perlin |
| 2003/0134320 | A1* | 7/2003 | Barrus et al. .................... 435/6 |
| 2003/0143554 | A1 | 7/2003 | Berres et al. |
| 2003/0225530 | A1* | 12/2003 | Lowe et al. .................... 702/20 |
| 2004/0215401 | A1* | 10/2004 | Krane et al. .................... 702/20 |
| 2008/0154517 | A1* | 6/2008 | Barrus et al. .................... 702/20 |

OTHER PUBLICATIONS

Applied Biosystems, Getting Started Guide (Rev B): SNaPshot Kit Analysis, 2005 pp. 1-108.*
Thomas H. Cormen, et al., "Introduction to Algorithms," MIT Press (Cambridge, MA)/McGraw-Hill (New York), 1990.
A. Guttman, "R trees: a dynamic index structure for spatial searching," ACM, 1984, 47-57.
T. Sellis, et al., "The R*-tree: a dynamic index for multi-dimensional objects," Tech. Rept. UMI-ACS TR 87 3, CSS TR 1975, University of Maryland, Feb. 1987, 1-24.
Robert C. Holte, "Very Simple Classification Rules Perform Well on Most Commonly Used Datasets," Machine Learning, II,1993, pp. 63-90.
Juha Karhunen et al., "Locally Linear Independent component analysis," International Joint Conference on Neural Networks, 1999, vol. 2, pp. 882-887.
Message Passing Interface Forum, MPI: A Message-Passing Interface Standard, version 1.1, Jun. 1995. Also at http://www-unix.mcs.anl.gov/mpi/ and http://www.mpi-forum.org/docs/mpi-11-html.
Universal Data Option for Informix Dynamic Server, version 9.14 for Windows NT and UNIX. Also at http://www.informix.com/informix/techbriefs/udo/udo.pdf.
A. Geist et al., "PVM: Parallel Virtual Machine: A User's Guide and Tutorial for Networked Parallel Computing," MIT Press, 1994.
G. Strang, Linear Algebra and its Applications, 2nd ed., Academic Press, New York, 1980.
Bruce Budowle et al., "Genotype profiles for six population groups at the 13 CODIS short tandem repeat core loci and other PCR based loci," Forensic Science Communications, FBI Laboratory Division Publication 99-06, U.S. Department of Justice, Federal Bureau of Investigation, Jul. 1999, V. 1, n. 2.
J. R. Quinlan, "Induction of decision trees," Machine Learning 1:81-106, 1986.
Michael W. Berry et al., "Matrices, vector spaces, and information retrieval," SIAM Review 41:335-362. 1999.
Message Passing Interface Forum, MPI-2: Extensions to the Message-Passing Interface, Jul. 18, 1997. Also at http://www.mpi-forum.org/docs/mpi-20-html/mpi2-report.html.
Atsuo Yoshitaka et al., "A Survey on Content-Based Retrieval for Multimedia Databases," IEEE Transactions On Knowledge And Data Engineering, vol. 11, No. 1, Jan./Feb. 1999, pp. 81-93.
Peter N. Yianilos, "Excluded Middle Vantage Point Forests for Nearest Neighbor Search," Jul. 20, 1998 (revised Sep. 11, 1998), pp. 1-12.
Peter N. Yianilos, "Data Structures and Algorithms for Nearest Search in General Metric Spaces," 1993, 11 Pages.
Marvin Shapiro, "The Choice of Reference Points in Best-Match File Searching,"Communications of the ACM, vol. 20, No. 5, May 1977, pp. 339-343.
Davood Rafiei et al., "Similarity-Based Queries for Time Series Data," Proceedings of the 1997 ACM SIGMOD International Conference on Management of Data, May 1997, pp. 1-13.
King-Ip Lin et al., "The TV-tree-an index structure for high-dimensional data," 1994, pp. 1-30.
Paolo Ciaccia et al., "M-tree: An Efficient Access Method for Similarity Search in Metric Spaces," Proceedings of the 23rd VLDB Conference, Athens, Greece, 1997, 10 Pages.
W. A. Burkhard et al., "Some Approaches to Best-Match File Searching," Communications of the ACM, vol. 16, No. 4, Apr. 1973, pp. 230-236.
Sergey Brin, "Near Neighbor Search in Large Metric Spaces," Proceedings of the 21st VLDB Conference, Zurich, Switzerland, 1997, 11 Pages.
Tolga Bozkaya et al., "Distance-Based Indexing For High-Dimensional Metric Spaces," 1997, 12 Pages.
Andrew Berman et al., "Selecting Good Keys for Triangle-Inequality-Based Pruning Algorithms," IEEE, 1997, pp. 12-19.
Norbert Beckmann et al., "The R*-tree: An Efficient and Robust Access Method for Points and Rectangles," ACM, 1990, pp. 322-331.
Richardo Baeza-Yates et al., "Proximity Matching Using Fixed-Queries Trees," 1994, 13 Pages.
Franz Aurenhammer, "Voronoi Diagrams—Survey of a Fundamental Geometric Data Structure," ACM Computing Surveys, vol. 23, No. 3, Sep. 1991, pp. 345-405.
Thomas E. Anderson et al., "A Case for NOW (Networks of Workstations)," IEEE, 1995, pp. 54-64.
Brian Tierney et al., "NetLogger: A Toolkit for Distributed System Performance Tuning and Debugging," Dec. 10, 2002, pp. 1-8.
Rajkumar Buyya et al., "GARDMON: A Java-based Monitoring Took for Gardens Non-dedicated Cluster Computing System," 1999, pp. 1-7.
Henri Casanova et al., "NetSolve: A Network Server for Solving Computational Science Problems," Apr. 26, 1996, pp. 1-14.
Luiz De Rose et al., "An Approach to Immersive Performance Visualization of Parallel and Wide-Area Distributed Applications," 1999, 8 Pages.
The Falcon Monitoring and Steering System, printed from http://www.cc.gatech.edu/systems/projects/FALCON/ printed on Jan. 29, 2004, 3 Pages.
Ian Foster et al., "Globus: A Metacomputing Infrastructure Toolkit," 1997, pp. 1-16.
Daniel E. Reed et al., "Delphi: An Integrated, Language-Directed Performance Prediction, Measurement and Analysis Environment," 1999, 4 Pages.
Andrew S. Grimshaw et al., "Legion: The Next Logical Step Toward a Nationwide Virtual Computer," Technical Report No. CS-94-21, Jun. 1994, pp. 1-23.
Weiming Gu et al., "Falcon: On-line Monitoring and Steering of Large-Scale Parallel Programs," Technical Report No. GIT-CC-94-21, 1994, pp. 1-38.
Chung-Hsing Hsu et al., "IPERF: A Framework for Automatic Construction of Performance Prediction Models," 1998, pp. 1-10.
Big Brother System and Network Monitor—About Us, printed from http://bb4.com/aboutus.html on Jan. 29, 2004, 2 Pages.
Big Brother System and Network Monitor—Welcome, printed from http://bb4.com/index.html on Jan. 29, 2004, 2 Pages.
Memory Utilization Tracking Tool (MUTT), printed from http://ext.lanl.gov/orgs/cic/cic8/para-dist-team/mutt/muttdoc.html on Jan. 29, 2004, 6 Pages.
Nova: Networked Object-Based EnVironment for Analysis, printed from http://www.usatlas.bn1.gov/~wenaus/nova on Jan. 29, 2004, 7 Pages.
Zhengyu Liang et al., "ClusterProbe: An Open, Flexible and Scalable Cluster Monitoring Tool," 1999, pp. 1-10.

Barton P. Miller et al., "The Paradyn Parallel Performance Measurement Tools," pp. 1-23.

G. A. Geist et al., "A User's Guide to PICL A Portable Instrumented Communication Library," Oak Ridge National Laboratory, Mathematical Sciences Section, Oct. 1990, 22 Pages.

A. Espinosa et al., "Automatic Performance Analysis Of Parallel Programs," Computer Science Department, 7 Pages.

B. Tierney et al., "The NetLogger Methodology for High Performance Distributed Systems Performance Analysis," IEEE, Jul. 1998, pp. 1-8.

Rich Wolski et al., "Implementing a Performance Forecasting System for Metacomputing: The Network Weather Service," UCSD Technical Report TR-CS97-50, May 20, 1997, pp. 1-10.

Rich Wolski, "Dynamic Forecasting Network Performance Using the Network Weather Service," UCSD Technical Report TR-CS96-494, Jan. 7, 1998, pp. 1-35.

Perlin, M.W., "An Expert System for Scoring DNA Database Profiles", Genetic Identity Conference Proceedings. International Symposiumon Human Identification, XX, XX, Oct. 7, 2000, pp. 1-30.

Palsson B. et al., "Using Quality Measures to Facilitate Allele Calling in High-Throughput Genotyping", Genome Research, Cold Spring Harbor Laboratory Press, Woodbury, NY, US, vol. 9, Oct. 1, 1999, pp. 1002-1012.

International Search Report corresponding to International Application No. PCT/US2007/084656 dated Aug. 28, 2008.

* cited by examiner

| | K1 | K2 | Q1 | Q2 | Q3 |
|---|---|---|---|---|---|
| Status | Inspect | Inspect | OK | OK | Inspect |
| Info | Concordance Mixture | Concordance | Concordance | Concordance | Concordance Mixture |
| Process | - | - | - | - | - |
| D3S1358 | 13 15 17 * | 18 | 15 16 | 17 18 | 17 18 |
| vWA | 17 | 15 19 | 15 17 | 16 19 | 14 16 (OL) |
| FGA | 22 | 22 24 (OL) | 19 26 | 21 22 | 26 27 |
| Amelogenin | XY | X | XY | X | X |
| D8S1179 | 11 16 | 13 14 | 13 14 | 10 12 | 13 14 |
| D21S11 | 31 32.2 | 30 33.2 | 31 | 29 30 | 29 (30) 31 |
| D18S51 | 12 15 | 16 17 | 12 15 | 15 17 | 14 22 |
| D5S818 | 11 14 | 10 12 | 12 13 | 11 | (11) 12 13 |
| D13S317 | 9 11 | 11 12 | 8 9 | 8 12 | 9 12 |
| D7S820 | 12 | 10 (14) * | 9 12 | 10 11 | 10 11 |
| D16S539 | 10 11 | 9 11 | 9 12 | 9 | 11 14 |
| TH01 | (8) 9 10 | 6 | 9 | 9 | 8 9.3 |
| TPOX | 8 9 | 8 | 8 11 | 8 11 | 8 11 |
| CSF1PO | 11 13 | 10 12 | 10 11 | 12 | 12 |

FIG. 1

**Demo1* - STRESP - Interactive Call Sheet**

Call Sheet | Match Results

| | K1 | K2 | Q1 | Q2 | Q3 |
|---|---|---|---|---|---|
| Status | Inspect | Inspect | OK | OK | Inspect |
| Info | Concordance Mixture | Concordance | Concordance | Concordance | Concordance Mixture |
| Process | - | - | - | - | - |
| D3S1358 | 13 15 17 * | 18 | 15 16 | 17 18 | 17 18 |
| vWA | 17 | | 17 | 16 19 | 14 16 (OL) |
| FGA | 22 | | 26 | 21 22 | 26 27 |
| Amelogenin | XY | K1 ▶ | | X | X |
| D8S1179 | 11 16 | 13 14 | 13 14 | 10 12 | 13 14 |
| D21S11 | 31 32.2 | 30 33.2 | 31 | 29 30 | 29 (30) 31 |
| D18S51 | 12 15 | 16 17 | 12 15 | 15 17 | 14 22 |
| D5S818 | 11 14 | 10 12 | 12 13 | 11 | (11) 12 13 |
| D13S317 | 9 11 | 11 12 | 8 9 | 8 12 | 9 12 |
| D7S820 | 12 | 10 (14) * | 9 12 | 10 11 | 10 11 |
| D16S539 | 10 11 | 9 11 | 9 12 | 9 | 11 14 |
| TH01 | (8) 9 10 | 6 | 9 | 9 | 8 9.3 |
| TPOX | 8 9 | 8 | 8 11 | 8 11 | 8 11 |
| CSF1PO | 11 13 | 10 12 | 10 11 | 12 | 12 |

Popup menu: Show Sources / Add Contributor / K1 ▶

FIG. 2

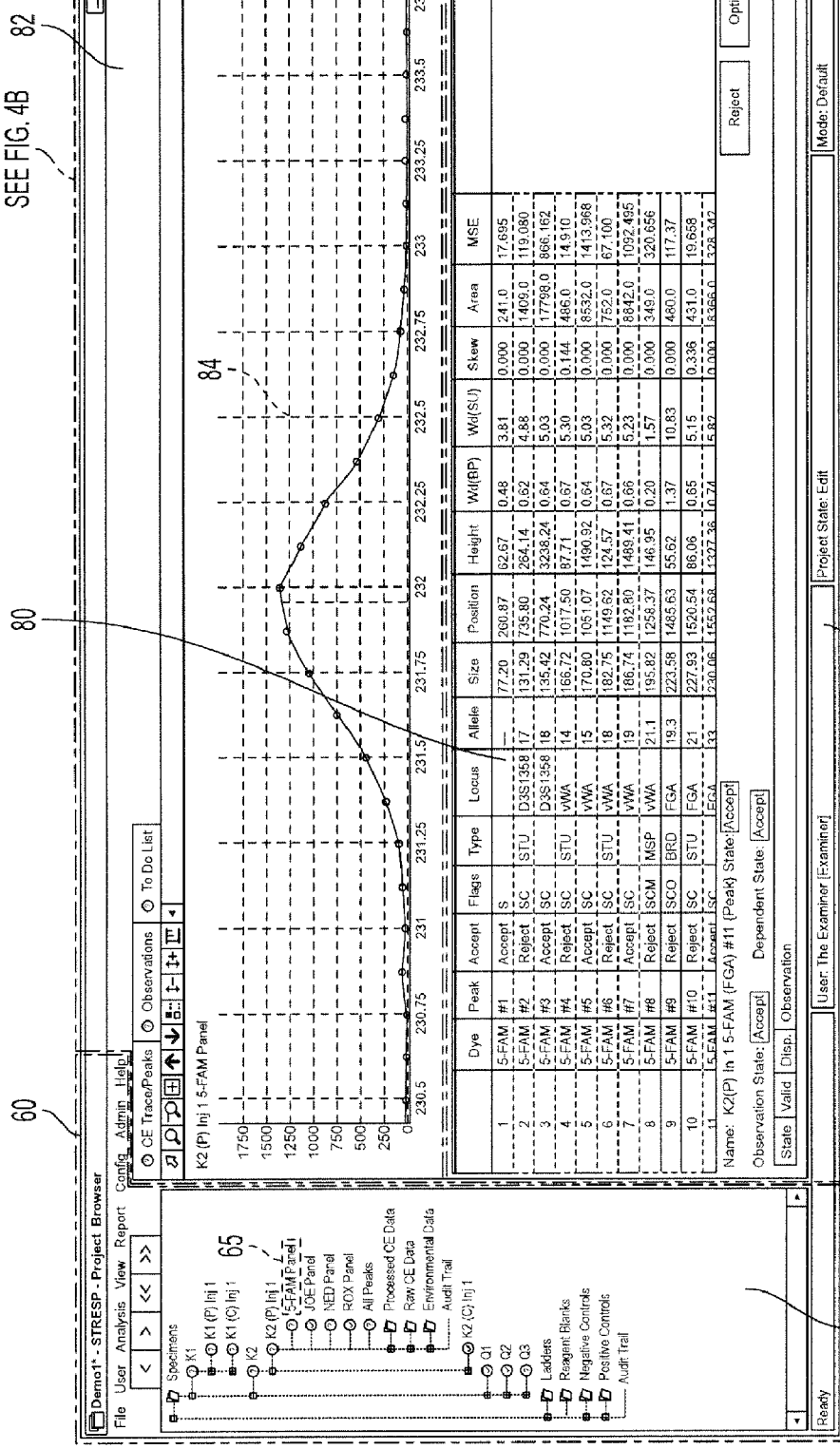
FIG. 4 MAP

| | Dye | Peak | Accept | Flags | Type | Locus | Allele | Size | Position | Height | Wd(BP) | Wd(SU) | Skew | Area | MSE |
|---|---|---|---|---|---|---|---|---|---|---|---|---|---|---|---|
| 1 | 5-FAM | #1 | Accept | S | | | -- | 77.20 | 260.87 | 62.67 | 0.48 | 3.81 | 0.000 | 241.0 | 17.695 |
| 2 | 5-FAM | #2 | Reject | SC | STU | D3S1358 | 17 | 131.29 | 735.80 | 264.14 | 0.62 | 4.88 | 0.000 | 1409.0 | 119.080 |
| 3 | 5-FAM | #3 | Accept | SC | | D3S1358 | 18 | 135.42 | 770.24 | 3238.24 | 0.64 | 5.03 | 0.000 | 17798.0 | 866.162 |
| 4 | 5-FAM | #4 | Reject | SC | STU | vWA | 14 | 166.72 | 1017.50 | 87.71 | 0.67 | 5.30 | 0.144 | 486.0 | 14.910 |
| 5 | 5-FAM | #5 | Accept | SC | | vWA | 15 | 170.80 | 1051.07 | 1490.92 | 0.64 | 5.03 | 0.000 | 8532.0 | 1413.968 |
| 6 | 5-FAM | #6 | Reject | SC | STU | vWA | 18 | 182.75 | 1149.62 | 124.57 | 0.67 | 5.32 | 0.000 | 752.0 | 67.100 |
| 7 | 5-FAM | #7 | Accept | SC | | vWA | 19 | 186.74 | 1182.80 | 1489.41 | 0.66 | 5.23 | 0.000 | 8842.0 | 1092.495 |
| 8 | 5-FAM | #8 | Reject | SCM | MSP | vWA | 21.1 | 195.82 | 1258.37 | 146.95 | 0.20 | 1.57 | 0.000 | 349.0 | 320.656 |
| 9 | 5-FAM | #9 | Reject | SCO | BRD | FGA | 19.3 | 223.58 | 1485.63 | 55.62 | 1.37 | 10.83 | 0.000 | 480.0 | 117.37 |
| 10 | 5-FAM | #10 | Reject | SC | STU | FGA | 21 | 227.93 | 1520.54 | 86.06 | 0.65 | 5.15 | 0.336 | 431.0 | 19.658 |
| 11 | 5-FAM | #11 | Accept | SC | | FGA | 33 | 230.06 | 1552.68 | 1327.36 | 0.74 | 5.82 | 0.000 | 8366.0 | 328.342 |

Name: K2(P) in 15-FAM (FGA) #11 (Peak) State: Accept

Observation State: Accept  Dependent State: Accept

| State | Valid | Disp. | Observation |

Reject  Options

FIG. 4C

| Demo1* - STRESP - Interactive Call Sheet | | | | | |
|---|---|---|---|---|---|
| Call Sheet / Match Results | | | | | |
| | K1 | K2 | Q1 | Q2 | Q3 |
| Status | Inspect | Inspect | OK | OK | Inspect |
| Info | Concordance Mixture | Concordance | Concordance | Concordance | Concordance Mixture |
| Process | - | - | - | - | - |
| D3S1358 | 13 15 17 * | 18 | 15 16 | 17 18 | 17 18 |
| vWA | 17 | 15 19 | 15 17 | 16 19 | 14 16 (OL) |
| FGA | 22 | 22 24 (OL) | 19 26 | 21 22 | 26 27 |
| Amelogenin | XY | X | XY | X | X |
| D8S1179 | 11 16 | 13 14 | 13 14 | 10 12 | 13 14 |
| D21S11 | 31 32.2 | 30 33.2 | 31 | 29 30 | 29 (30) 31 |
| D18S51 | 12 15 | 16 17 | 12 15 | 15 17 | 14 22 |
| D5S818 | 11 14 | 10 12 | 12 13 | 11 | (11) 12 13 |
| D13S317 | 9 11 | 11 12 | 8 9 | 8 12 | 9 12 |
| D7S820 | 12 | 10 (14) * | 9 12 | 10 11 | 10 11 |
| D16S539 | 10 11 | 9 11 | 9 12 | 9 | 11 14 |
| TH01 | (8) 9 10 | 6 | 9 | 9 | 8 9.3 |
| TPOX | 8 9 | 8 | 8 11 | 8 11 | 8 11 |
| CSF1PO | 11 13 | 10 12 | 10 11 | 12 | 12 |

FIG. 5

| | 115 | 135 | 120 | 132 | 134 |
|---|---|---|---|---|---|
| | Demo1* - STRESP - Examiner To Do List | | | | |
| | Item | Observation | | State | Source |
| 1 | Profile: K1 (P) Inj 1 | D3S1358 locus has 3 or more alleles. | | Inspect | STRESP |
| 2 | Locus: K1 D3S1358 | D3S1358 locus has a concordance error. | | Inspect | STRESP |
| 3 | Profile: K1 (C) Inj 1 | TH01 locus has 3 or more alleles. | | Inspect | STRESP |
| 4 | Peak: K2 (P) Inj 1 5-FAM (FGA) #16 | Off ladder peak. | | Inspect | STRESP |
| 5 | Peak: K2 (P) Inj 1 NED (D7S820) #11 | Peak may be a multi-channel spike. | | Inspect | STRESP |
| 6 | Profile: K2 (P) Inj 1 | FGA locus has 3 or more alleles. | | Inspect | STRESP |
| 7 | Profile: K2 (P) Inj 1 | D7S820 locus has a peak height imbalance. | | Inspect | STRESP |
| 8 | Locus: K2 D7S820 | D7S820 locus has a concordance error. | | Inspect | STRESP |
| 9 | Profile: K2 | FGA locus has 3 or more alleles. | | Inspect | STRESP |
| 10 | Profile: K2 | D7S820 locus has a peak height imbalance. | | Inspect | STRESP |
| 11 | Peak: Q3 (P) Inj 1 5-FAM (vWA) #7 | In overlap region between loci vWA and FGA. | | Inspect | STRESP |

125

Edited: 0 of 11   Reviewed: 0 of 11   Feedback: 0 of 11
Examiner Comments:                    Reviewer Comments:

| | Demo1* - STRESP - Examiner To Do List | | | |
|---|---|---|---|---|
| | Item | Observation | State | Source |
| 1 | Profile: K1 (P) Inj 1 | D3S1358 locus has 3 or more alleles. | Inspect | STRESP |
| 2 | Locus: K1 D3S1358 | D3S1358 locus has a concordance error. 140 | Inspect | STRESP |
| 3 | Profile: K1 (C) Inj 1 | TH01 locus has 3 o | pect | STRESP |
| 4 | Peak: K2 (P) Inj 1 5-FAM (FGA) #16 | Off ladder peak. Accept Observed Item | pect | STRESP |
| 5 | Peak: K2 (P) Inj 1 NED (D7S820) #11 | Peak may be a mu  Reject Observed Item | pect | STRESP |
| 6 | Profile: K2 (P) Inj 1 | FGA locus has 3 or | pect | STRESP |
| 7 | Profile: K2 (P) Inj 1 | D7S820 locus has  Explore in Browser | pect | STRESP—155 |
| 8 | Locus: K2 D7S820 | D7S820 locus has  View Observations | pect | STRESP |
| 9 | Profile: K2 | FGA locus has 3 or Reject/Flag Item | pect | STRESP—150 |
| 10 | Profile: K2 | D7S820 locus has  View Audit Trail | pect | STRESP |
| 11 | Peak: Q3 (P) Inj 1 5-FAM (vWA) #7 | In overlap region b | | |
| | | Define As Mixture —155 | | |
| | | —145 | | |

Edited: 0 of 11   Reviewed: 0 of 11   Feedback: 0 of 11
Examiner Comments:                    Reviewer Comments:

FIG. 7

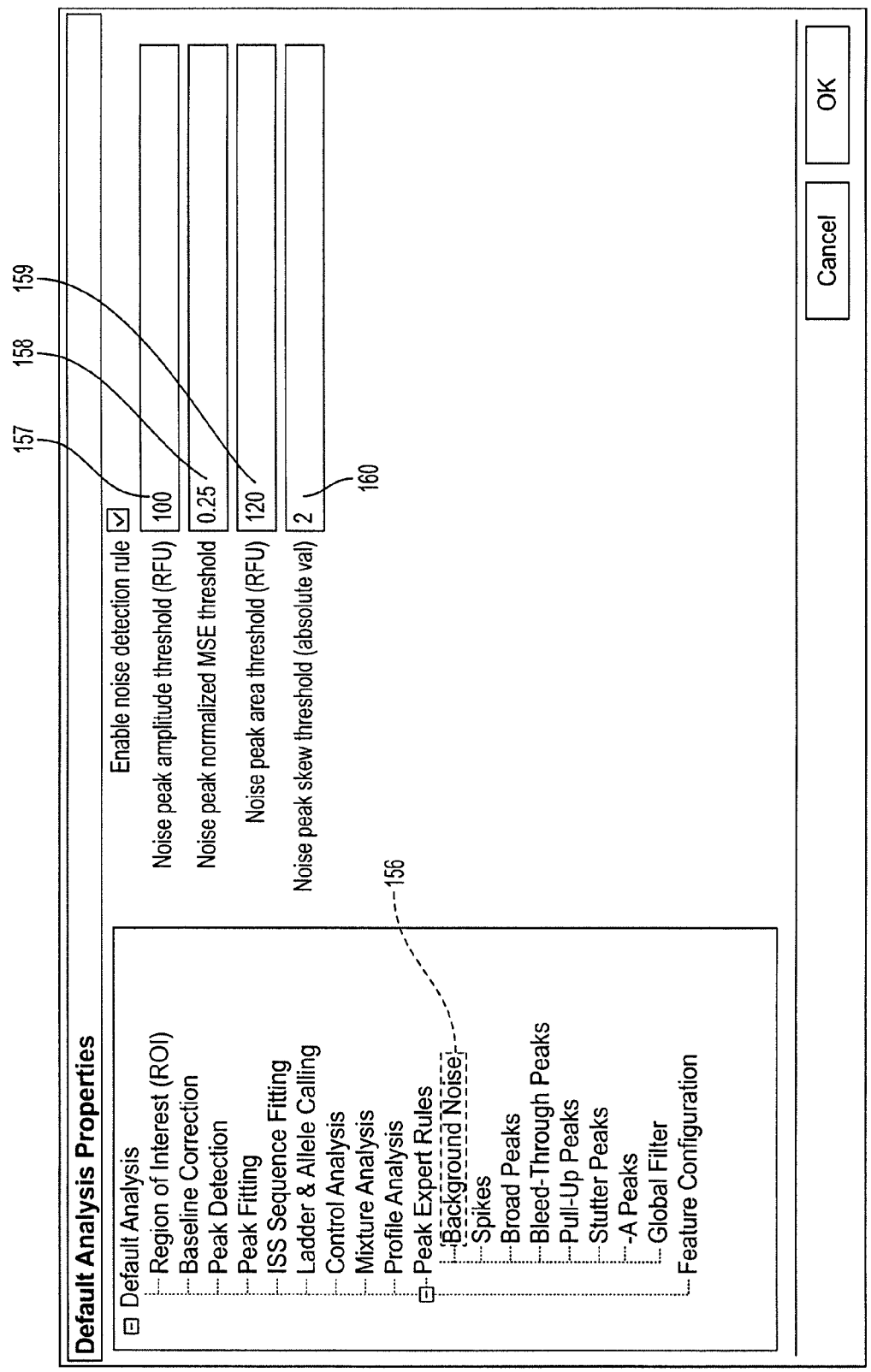
FIG. 7.1

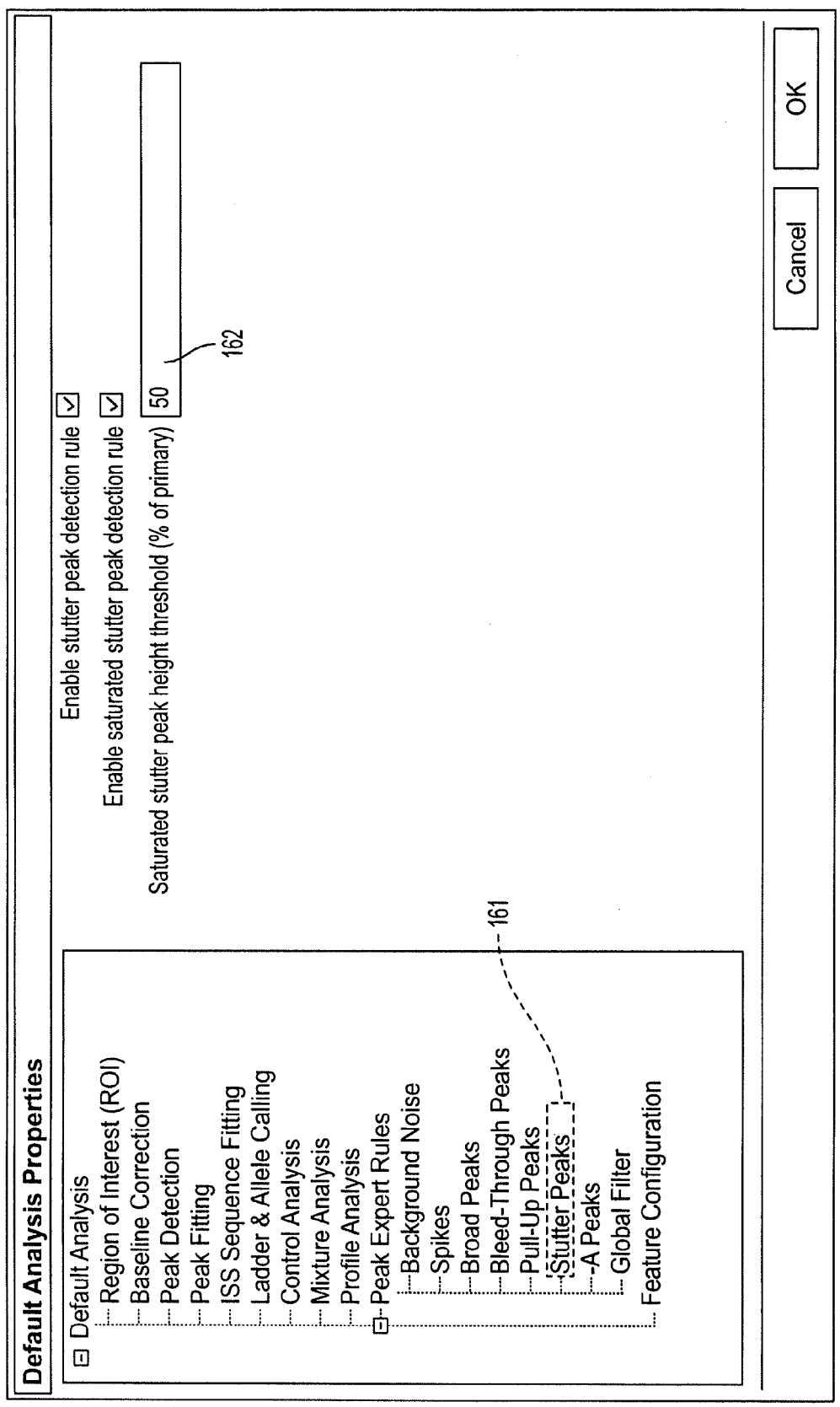
FIG. 7.2

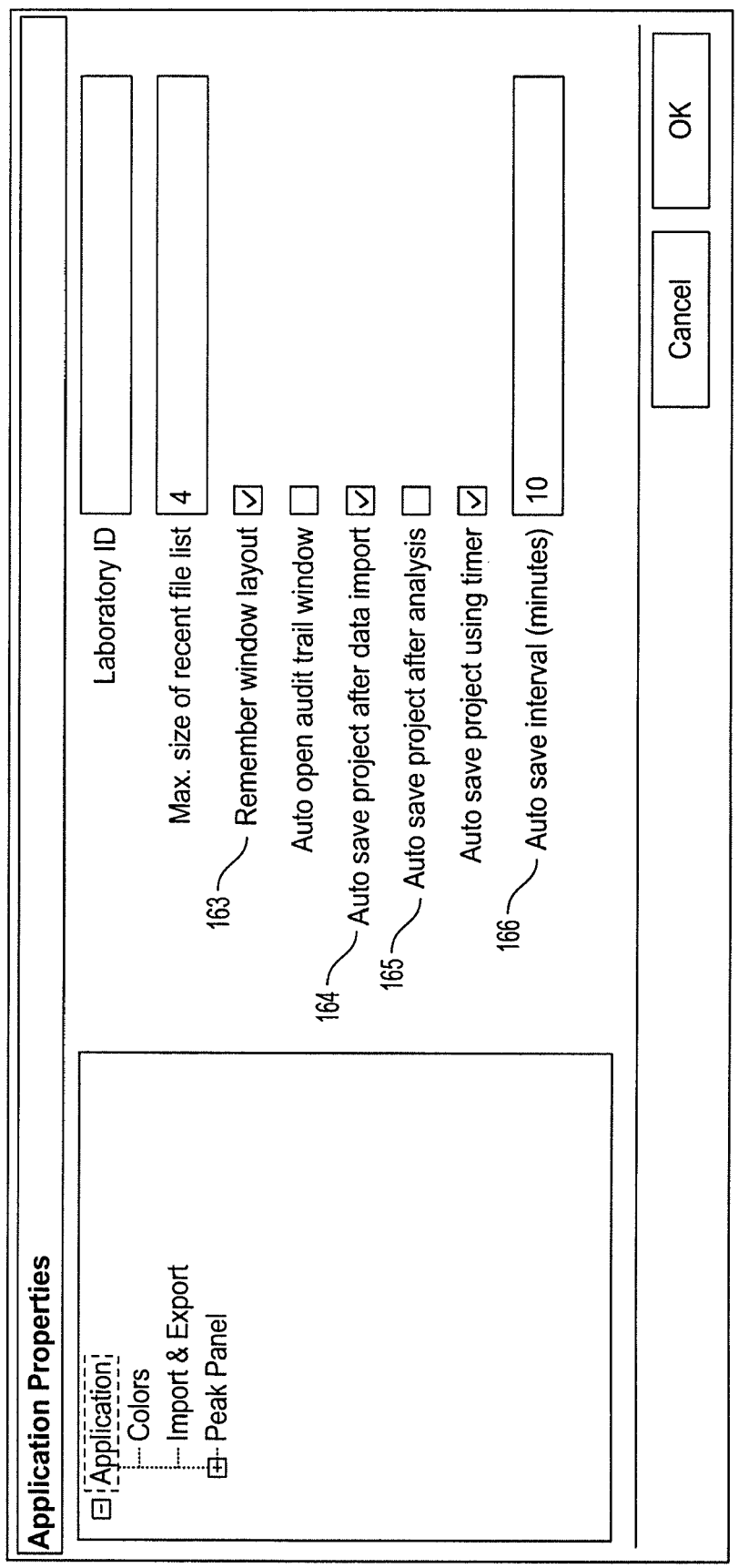
FIG. 7.3

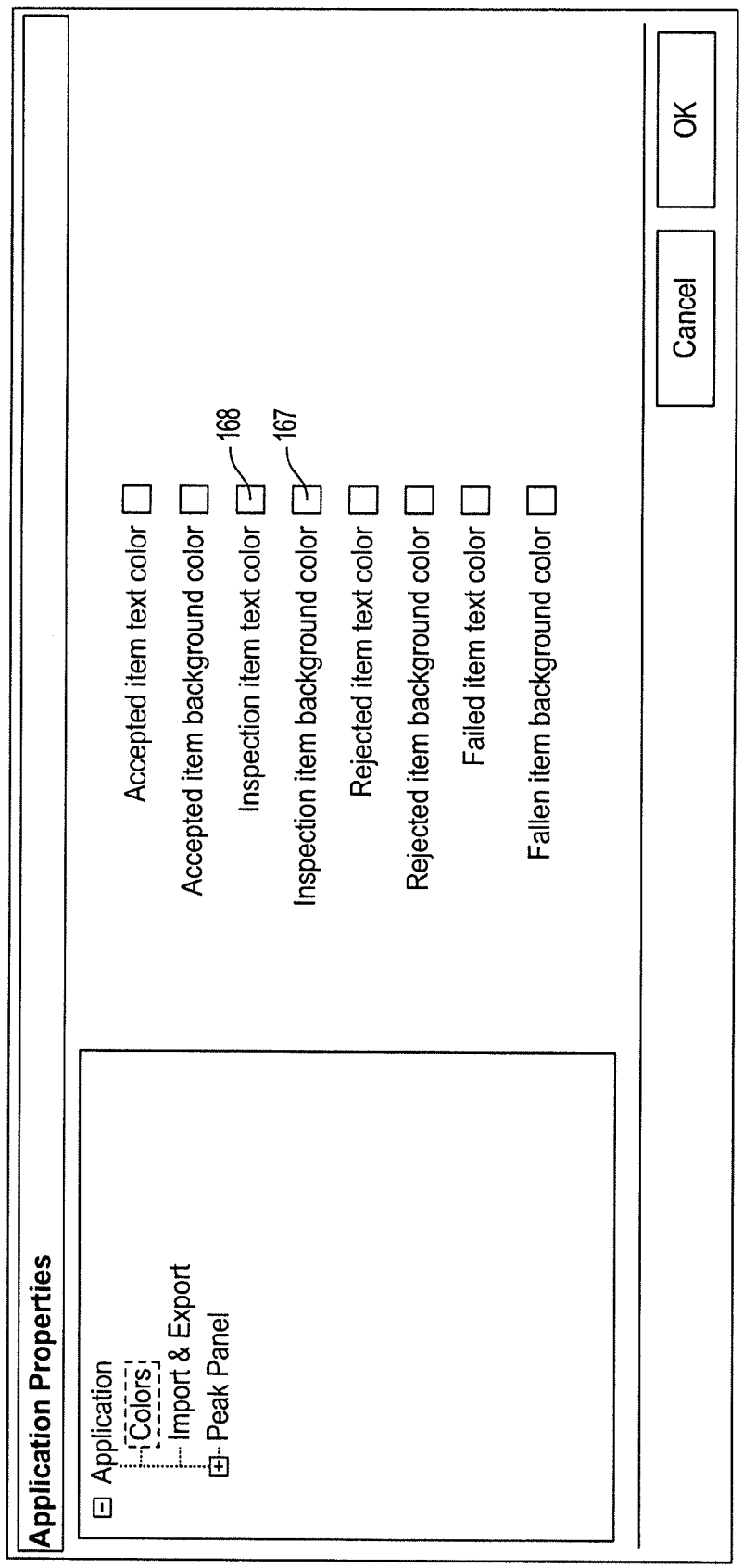
FIG. 7.4

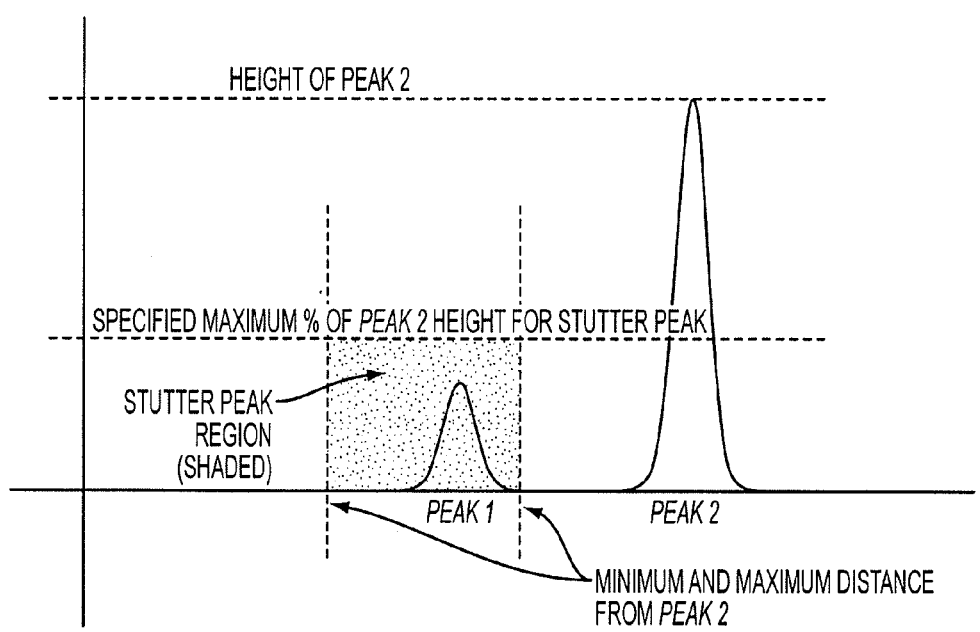
FIG. 7.5

FIG. 8A

| Profile | State | Type | D3S1358 | vWA | FGA | Amelogenin | D8S1179 | D21S11 | D18S11 | D5S818 | D13S317 | D7S820 | D16S539 | TH01 | TPOX | CSF1PO |
|---|---|---|---|---|---|---|---|---|---|---|---|---|---|---|---|---|
| K1 | Inspct | Concordance (Mix) | 13 15 17 * | 17 | 22 | XY | 11 16 | 31 32.2 | 12 15 | 11 14 | 9 11 | 12 | 10 11 | (8) 9 10 | 8 9 | 11 13 |
| K1 (P) Inj 1 | Inspct | Injection | 13 15 17 | 17 | 22 | XY | 11 16 | 31 32.2 | 12 15 | 11 14 | 9 11 | 12 | | | | |
| K1 (C) Inj 1 | Inspct | Injection | 15 17 | | | XY | | | | | 9 11 | 12 | 10 11 | (8) 9 10 | 8 9 | 11 13 |

Injection List

| Profile | State | Amp. Kit | NC | RB | Extr | Amp | Prep | ladder | Lad. Method | Data File |
|---|---|---|---|---|---|---|---|---|---|---|
| K1 (P) Inj 1 | Accept | AmpFlSTR Profiler Plus | NC-2:2:P | Missing | 1 | 2 | 2 | Ladder-2:2:P | Closest in Time | pp_K-1.fsa |
| K1 (C) Inj 1 | Accept | AmpFlSTR COfiler | NC-1:1:C | Missing | 1 | 2 | 1 | Ladder-1:1:C | Closest in Time | co_K-1.fsa |

Observations (for Selection)

Name: Nothing Selected  State:
Observation State:  Dependent State:
State | Valid | Disp. | Observation

| | Item | Observation | State | Source |
|---|---|---|---|---|
| 1 | Profile: K1 (P) Inj 1 | D3S1358 locus has 3 or more alleles. | Inspect | STRESP |
| 2 | Locus: K1 D3S1358 | D3S1358 locus has a concordance error. | Inspect | STRESP |
| 3 | Profile: K1 (C) Inj 1 | TH01 locus has 3 or more alleles. | Inspect | STRESP |
| 4 | Peak: K2 (P) Inj 1 5-FAM (FGA) #16 | Off ladder peak. | Inspect | STRESP |
| 5 | Peak: K2 (P) Inj 1 NED (D7S820) #11 | Peak may be a multi-channel spike. | Inspect | STRESP |
| 6 | Profile: K2 (P) Inj 1 | FGA locus has 3 or more alleles. | Inspect | STRESP |
| 7 | Profile: K2 (P) Inj 1 | D7S820 locus has a peak height imbalance. | Inspect | STRESP |
| 8 | Locus: K2 D7S820 | D7S820 locus has a concordance error. | Inspect | STRESP |
| 9 | Profile: K2 | FGA locus has 3 or more alleles. | Inspect | STRESP |
| 10 | Profile: K2 | D7S820 locus has a peak height imbalance. | Inspect | STRESP |
| 11 | Peak: Q3 (P) Inj 1 5-FAM (vWA) #7 | In overlap region between loci vWA and FGA. | Inspect | STRESP |

Edited: 0 of 11   Reviewed: 0 of 11   Feedback: 0 of 11
Examiner Comments:            Reviewer Comments:

FIG. 8B

| | K1 | K2 | Q1 | Q2 | Q3 |
|---|---|---|---|---|---|
| Status | Inspect | Inspect | OK | OK | Inspect |
| Info | Concordance Mixture | Concordance | Concordance | Concordance | Concordance Mixture |
| Process | - | - | - | - | - |
| D3S1358 | 13 15 17 * | 18 | 15 16 | 17 18 | 17 18 |
| vWA | 17 | 15 19 | 15 17 | 16 19 | 14 16 (OL) |
| FGA | 22 | 22 24 (OL) | 19 26 | 21 22 | 26 27 |
| Amelogenin | XY | X | XY | X | X |
| D8S1179 | 11 16 | 13 14 | 13 14 | 10 12 | 13 14 |
| D21S11 | 31 32.2 | 30 33.2 | 31 | 29 30 | 29 (30) 31 |
| D18S51 | 12 15 | 16 17 | 12 15 | 15 17 | 14 22 |
| D5S818 | 11 14 | 10 12 | 12 13 | 11 | (11) 12 13 |
| D13S317 | 9 11 | 11 12 | 8 9 | 8 12 | 9 12 |
| D7S820 | 12 | 10 (14) * | 9 12 | 10 11 | 10 11 |
| D16S539 | 10 11 | 9 11 | 9 12 | 9 | 11 14 |
| TH01 | (8) 9 10 | 6 | 9 | 9 | 8 9.3 |
| TPOX | 8 9 | 8 | 8 11 | 8 11 | 8 11 |
| CSF1PO | 11 13 | 10 12 | 10 11 | 12 | 12 |

FIG. 8C

METHOD OF ORGANIZING AND PRESENTING DATA IN A TABLE USING STUTTER PEAK RULE

The U.S. government retains certain rights to this invention due to funding provided by contract J-FBI-03-196 awarded by the Department of Justice, Federal Bureau of Investigation.

The subject matter of the present application is related to the subject matter of the following four co-assigned applications filed Nov. 16, 2006 with the present application: A METHOD OF ENHANCING ACCESS TO AN ITEM REQUIRING INPUT (U.S. application Ser. No. 11/560,576, abandoned), A METHOD OF ENHANCING EXPERT SYSTEM DECISION MAKING (U.S. application Ser. No. 11/560,580), A METHOD OF DISPLAYING AND INTERACTING WITH A COLLECTION OF DATA (U.S. application Ser. No. 11/560,588, abandoned), A METHOD OF INTERACTION WITH AN AUTOMATED SYSTEM (U.S. application Ser. No. 11/560,601). The contents of these four patent applications are herein incorporated by reference as to their entire contents.

TECHNICAL FIELD OF THE INVENTION

The technical field of the present invention relates to the interpretation of data by an automated system and provides methods of enhanced interaction with an automated system.

BACKGROUND

Automated systems are known for data analysis and display of data in numerous fields of interest. For example, in forensic science it is common for automated systems to assist forensic scientists in the identification of a biological sample using DNA profiles. The terrorist attacks of Sep. 11, 2001 placed huge demands on forensic scientists to identify human remains from the collapsed World Trade Center buildings. In light of these demands, forensic scientists need more efficient and more accurate tools to assist in the identification of biological specimens when using automated DNA profiling technology.

A forensic scientist may obtain a DNA profile from a sample obtained from a personal effect of a missing person such as a toothbrush, razor, or comb, and searches for a match in a database containing DNA profiles from unknown biological specimens of a missing person or victim's remains. One of many methods of obtaining a DNA profile are described below. One can extract DNA from an unknown biological specimen by using any DNA extraction technique. Many techniques for extracting DNA are well known in the art. See, e.g., Gurvitz et al. Australas Biotechnol. 1994 March-April; 4(2):88-91; Ma et al. J Forensic Sci Soc. 1994 October-December; 34(4):231-5; Laber et al. J Forensic Sci. 1992 March; 37(2):404-24. After DNA extraction, an amplification procedure such as the polymerase chain reaction can amplify the DNA with primers specific for various regions of interest. Most commonly, the regions of interest correspond to the polymorphic short tandem repeat (STR) loci of chromosomal DNA, which include D3S1358, vWA, FGA, D8S1179, D21S11, D18S51, D5S818, D13S317, D7S820, D16S539, TH01, TPOX, CSF1PO, Penta D, Penta E, D19S433, and AMEL. The amplification procedure may occur with fluorescently modified nucleotides, creating amplified DNA that is fluorescent. The fluorescent DNA is then separated by electrophoresis and the size of the DNA amplification product is determined subsequently by applicable software, allowing identification of the STR loci.

There is a need in the art, for example, for automated DNA STR analysis and methods for reducing workload on forensic scientists. A high workload, as is often the case after a terrorist incident, or a natural disaster, requires an extremely efficient workspace. Proper organization and presentation of data is crucial to ensure proper interpretation of results. Thus, technologies are needed in forensic science in addition to other fields that can enhance interaction with an automated system, and provide more efficient methods of organization and presentation of data.

SUMMARY OF INVENTION

Several embodiments are discussed herein which provide various methods of interaction with an automated system. In one embodiment, an item is organized and presented by way of displaying a table, wherein the table displays a plurality of data comprising analysis results characterizing the at least one item, and wherein an analysis result is based on a decision made by an expert system according to a rule base. Input is accepted from a source, wherein the input may cause the analysis results to be modified, and wherein the results may be modified by re-applying the rule base. In response to the input, an updated table is created, wherein the updated table comprises the modified analysis results. This updated table is then displayed.

In another embodiment, items requiring input are compiled into a list, wherein the list comprises at least one item that requires input and analysis results characterizing the at least one item. An analysis result is based on a decision made by the expert system according to a rule base. The list is displayable and input is accepted from a source, wherein the input might cause the analysis results to be modified. The results may be modified by re-applying the rule base. In response to the input, an updated list is created which comprises modified analysis results which characterize the at least one item.

In another embodiment, a method of enhancing expert system decision making through interaction with at least one source is provided. An expert system is presented with at least one problem and the expert system makes at least one first decision that attempts to resolve the at least one problem, wherein the first decision results from applying a rule base for the at least one problem. Input is accepted from at least one source and in response to the input the rule base might be re-applied. A second decision that attempts to resolve the at least one problem might result from re-applying the rule base. The second decision is different from the first decision.

In another embodiment, a method of displaying and interacting with a collection of data is provided. The data comprise analysis results for at least one item. A first view displays a portion of the collection of data, wherein the first view comprises an expandable tree, the expandable tree being displayable in a vertical frame within a project window. A table characterizing the at least one item is displayable in tabular form in a main frame adjacent to a vertical frame, wherein the table displays the analysis results characterizing the at least one item in response to selection within the expandable tree. The analysis results of the table in this view are modifiable by input from a source to create an updated table, wherein the updated table comprises the modified analysis results. A second view of a portion of a collection of data is displayed, wherein the second view comprises a table, wherein the table is organized in tabular form with a vertical column representing the at least one item. The table displays a plurality of data comprising analysis results characterizing the at least one item, wherein the analysis results of the table are modifiable by input from a source to create an updated table, wherein the updated table comprises the modified analysis results. The updated table is then displayable. A third view of a portion of the collection of data comprises a list, wherein the list comprises at least one item requiring input from a source and analysis results of the at least one item. Analysis results are modifiable by the input to create an updated list, wherein the updated list comprises the modified analysis results. The updated list is then displayable.

In an additional embodiment, a method of analyzing DNA electrophoresis data is provided. An expert system receives input from at least a first source. Data is imported and analyzed by an expert system, wherein the expert system makes at least one first decision, which characterizes the data based on a rule base. The at least one first decision is displayable and modifiable by a first input from a first source. In response to the first input from the first source, the rule base may be re-applied to make at least one second decision, wherein the at least one second decision is different from the at least one first decision, or the at least one first decision may be accepted. The at least one first decision or the at least one second decision is then displayable and modifiable in response to a first input from a second source. In response to the first input from the second source, the rule base is either re-applied to make at least one third decision, wherein the third decision is different from the second decision, or either the first or second decisions are accepted.

Other embodiments of the invention are computer-readable media, which store computer executable instructions for performing any of the disclosed methods.

BRIEF DESCRIPTION OF THE DRAWINGS

The present invention is illustrated by way of example, and not by way of limitation, in the figures of the accompanying drawings.

FIG. 1 is a window illustrating an organized table comprising data.

FIG. 2 is a window showing an expandable item.

FIG. 5 is a window illustrating an organized table comprising data that has been highlighted or marked for inspection.

FIG. 6 is a window illustrating an organized list comprising data that requires inspection.

FIG. 7 is a window showing an organized list with options for expanding an item and providing input.

FIG. 7.1 is a window displaying options for modifying customization parameters for an expert system.

FIG. 7.2 is a window displaying options for modifying customization parameters for an expert system.

FIG. 7.3 is a window displaying options for modifying customization parameters for an expert system.

FIG. 7.4 is a window displaying options for modifying customization parameters for an expert system.

FIG. 7.5 is an example graph displaying a potential "stutter peak."

FIG. 8 is an example computer screen comprising one of many possible configurations of simultaneously displaying a first (FIG. 8A), second (FIG. 8C), and third view (FIG. 8B) into a collection of data.

DETAILED DESCRIPTION OF INVENTION

Figure 3:
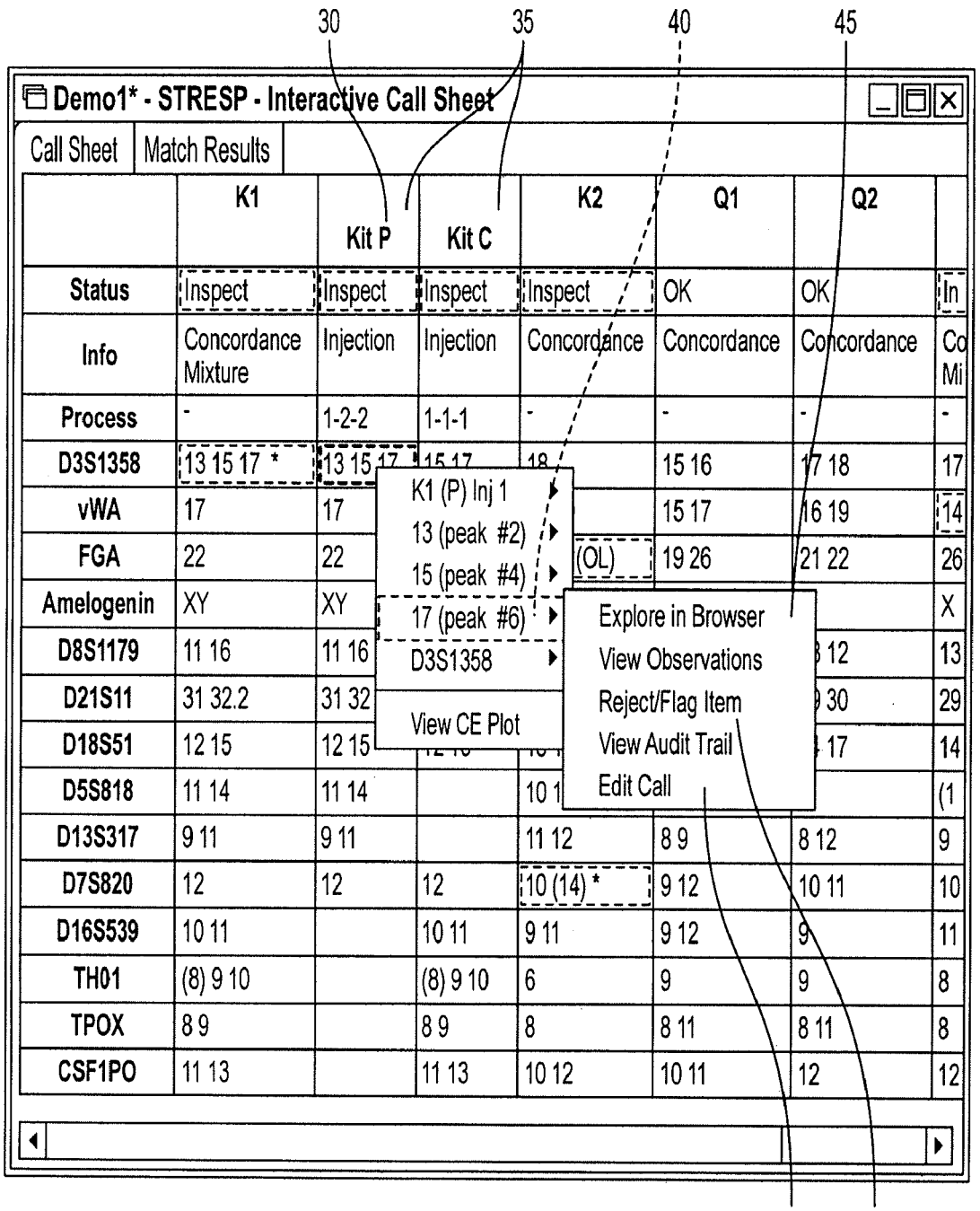
FIG. 3 is a window showing an organized table with options for expanding an item and providing input.

Referring to FIG. 1-10, here will now be described several embodiments of methods for organizing, presenting, and analyzing items. By way of example only, organizing and presenting processed STR DNA data or interpreting raw STR DNA data from capillary electrophoresis genetic analyzers, such as the known models ABI 310 and ABI 3100 available from Applied Biosystems, will be discussed in the context of the following embodiments.

DNA profiles may comprise allele data for a defined set of loci. Each locus may contain one or more allele names (typically a positive integer possibly followed by a decimal point and an integer from one through three, or one of the letters X or Y). DNA profile data may be obtained from one or more experiments performed on a sample. The experiments can then be organized into projects. Each experiment contains multiple time series of intensity measurements of optical fluorescence that correspond to the presence of dye-tagged DNA fragments at specific locations in a capillary. Detection of fluorescence peaks within a time series allows one to determine DNA fragment size by using an associated sizing standard. Each fluorescence peak is categorized by type and is assigned an allele value in association with a known allele ladder. In one aspect of these embodiments, it is essential to analyze raw data when analyzing a time series because the assignments made for each peak are determined by peak attributes that can only be obtained from the raw data. Analyzing raw DNA peak data is described in more detail in PCT application 2006/029434 (published as WO 2007/024408) which claims priority to U.S. Provisional Application 60/709, 424, both of which are incorporated by reference in their entirety.

It is preferred that an expert, either a human expert or an expert system, be utilized to categorize and interpret DNA data. Experts use shape and other peak features, including the relationships between peaks, to make decisions about whether peaks correspond to DNA alleles, or are artifacts due to the amplification process such as bleed-through, dye blobs, spikes, saturation, or other effects. In the following embodiments, the term "decision" is meant to comprise any decision or observation made on a peak, locus, profile, or specimen. An expert may also provide analysis for factors such as, but not limited to, contamination, procedural errors, temperature and electrical effects, and effects introduced by reagents and capillary aging.

The following discussion describes aspects in which an expert can be assisted by automated means, for example, by providing an organized table for displaying data, an organized list for displaying items that require attention, a method of updating various views and displaying items in a more efficient way. Also, methods are provided where external sources can provide input which may cause an automated system to modify its decisions.

In one embodiment, the term "item" as defined by the present invention pertains to any projects, specimen, data, such as Profile: K1 (P) Inj 1, or any piece of information which might be organized. A plurality of items may be analyzed when working with data such as DNA data and it is imperative to maintain a workstation with excellent organization. For example, FIG. 1 shows an item 1, which comprises specimen K1, wherein DNA from the specimen has been extracted, amplified via polymerase chain reaction, and separated via capillary electrophoresis. FIG. 1 displays a table 5 that is organized to present at least one item 1 to a source. A "source," as referred to by the present embodiment, includes but is not limited to an examiner, an expert, an expert system, a technician or other laboratory personnel, or a reviewer. In one embodiment, an examiner will make any initial decisions and a reviewer will review the examiner's work and provide feedback. Analysis results 10 characterize the item 1, and are displayable within a table 5. Characterizing an item is defined as providing information about an item. In this example, analysis results include but are not limited to allele data, such as: locus information for D3S1358, vWA, FGA, Amelogenin, D8S1179, D21S11, D18S51, D5S818, D13S317, D7S820, D16S539, TH01, TPOX, and CSF1PO. In addition, information relating to the status of the item, information pertaining to the item and information pertaining to processing of an item are also considered analysis results. One aspect of the embodiment is to display the analysis results of an item in the table 5 within a vertical column 15.

Figure 4A:
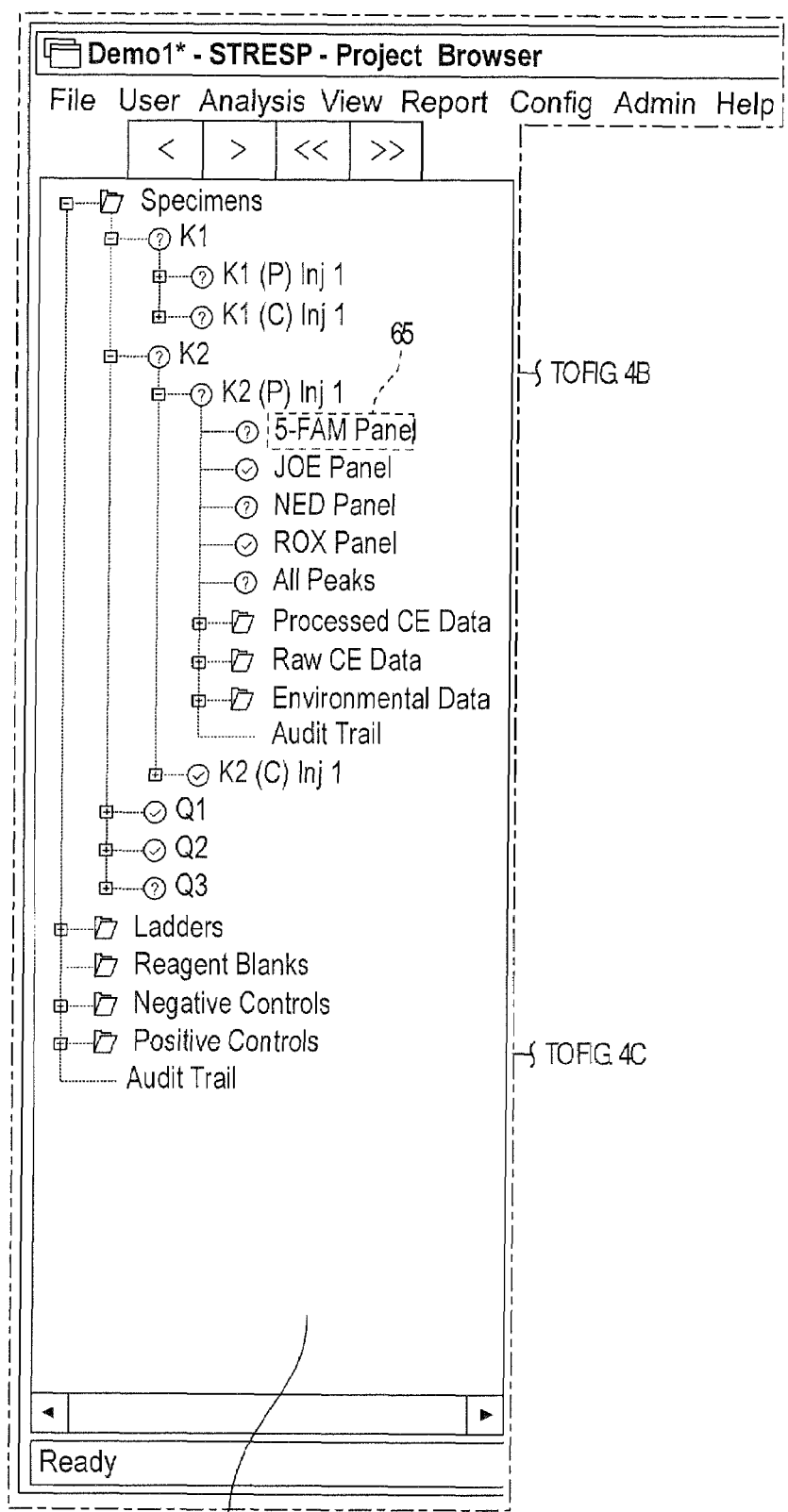
FIG. 4MAP is a map showing the components of a project browser window showing an expandable tree (FIG. 4A), an organized table (FIG. 4C), and a data graph (FIG. 4B).
Figure 4B:
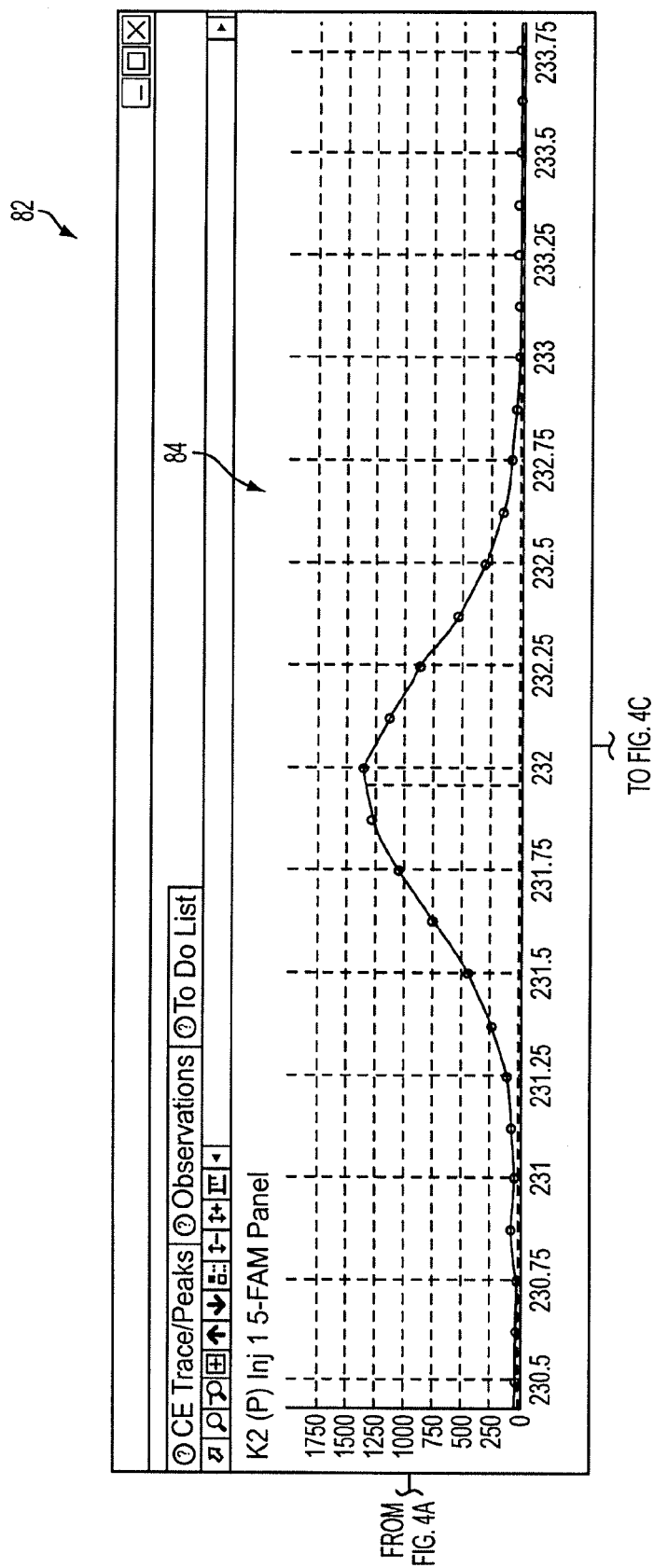

The item 1 may be expanded to display source or supporting data. Expanding an item, as taught by the present embodiment, comprises displaying at least a second vertical column adjacent to the first vertical column representing an item 1. FIG. 3 shows the second vertical column 30 may display source or supporting data. Source data comprises data which gives rise to the analysis results. Supporting data might include the source data as well as intermediate data that gives rise to the final analysis results. In another embodiment, source data might refer to the actual origin of data. Expanding an item can be accomplished by clicking on an item 1 or an analysis result 10 and selecting "Show Sources" 25. FIG. 2 shows clicking 20 on an item 1 to select "Show Sources" 25. FIG. 3 shows that item 1 has been expanded to show KitP and KitC 35 in second vertical column 30. FIG. 3 also shows selection of "17 peak #6," 40 which allows a user to, for example, "Explore in Browser" 45, "View Observations," "Reject/flag Item" 50, "view audit trail," or "edit call" 55. Source data can be further explored, or expanded in a project browser. FIG. 4MAP shows a map showing the components of a window "project browser" 60, or the first view, which is characterized by an expandable tree 65 (FIG. 4A) comprising at least one item, wherein the expandable tree is displayable in a vertical frame 70 within a project window 75. The project browser comprises a table 80 (FIG. 4C) displayed in a main frame 82 adjacent to the vertical frame 70. The main frame might comprise a plurality of data and information including but not limited to a table 80 (FIG. 4C) or data such as a graph 84 (FIG. 4B) representing a DNA peak which was analyzed by a DNA peak analysis program.

An additional feature of the current embodiment is that a system, such as an expert system, which is involved in DNA peak analysis, might be required to make a decision. To enhance this process, the system may request input from a source. This embodiment provides a method for allowing a source, for example, a user, to enter input, which can cause a decision to be modified by the expert system. Input is defined as accepting (agreeing), rejecting 50, editing 55, defining as a mixture, or instructing a system, such as an expert system, to modify all or part of the analysis results 10. Input according to the present invention also comprises any action made by a source, which is acknowledged by a system, for example, such as an expert system. In an environment where an expert system makes decisions based on a rule base, the expert system may be programmed to accept input, to assist in the problem solving that the expert system is undertaking. The input has the ability to instruct the expert system to modify a decision by re-evaluating a rule base. Item 1 could contain allele data wherein the peak height is below 200 RFU which, for example, might be outside a predetermined percentage of another peak's height. This result can, in this example, cause the expert system to prompt the source for input. The source may then accept or reject 50 the item causing a re-analysis of the rule base for assigning a peak. In one aspect, accepting a decision is accomplished by not providing any input. In another aspect, accepting a decision occurs by clicking on "accept observed item" 140 (FIG. 7). When a source accepts or rejects a "decision" made by an expert system, it means accepting or rejecting a decision, observation, and all or any part of the analysis results made on the decision. A source accepting or rejecting a decision also comprises accepting or rejecting the item's existence and all or any part of the analysis results associated with an item.

FIG. 5 shows that an expert system might request input by marking an item for inspection. To assist in notifying the source that inspection is required, the table 5 may contain a highlighted item 1 or a highlighted analysis result 10. Highlighting 90, as defined by the current invention, comprises changing the color of an item or an analysis result of an item. Highlighting also comprises marking the item with a designated symbol to draw source attention, or by labeling the status of an item with "Inspect" 95. Marking the item may comprise the use of a designated symbol such as an asterisk * 100, parentheses ( ) 105, or a designated symbol such as ~, !, @, #, $, %, ^, &, *, }, {, or /. The table 1 may also be displayed in a window 110, which can be launched or displayed at any time during the use of the program. A window is defined as a rectangular viewing area on a screen.

This embodiment accepts input from a source, which has the ability to cause a system, such as an expert system, to re-apply its rule base, or portions of its rule base, possibly coming to different conclusions, decisions, or observations from the initial conclusions, decisions, or observations made by the system. Input may cause an analysis result to change and therefore this change needs to be incorporated into a table 5. An updated table is created when analysis results change and the updated table is then displayable to the source. The term displaying, as used by the present invention, might involve displaying information or analysis results to a user. It is also possible for information to be displayed to another computer system, such as an expert system via a communications interface.

FIG. 6 shows an additional embodiment that involves a method of enhancing access to at least one item, or a plurality of items that may require input from a source. As described above, an expert may require additional expertise for certain problems, and therefore may require input to assist in resolving any problems. To enhance access to items requiring input, a list 115 is compiled which comprises at least one item that requires input. The list may also display analysis results, portions of analysis results, or observations 135 pertaining to analysis results. The list may be displayed in a window 120. Additionally, the user inspection status can be displayed within the window. User inspection status 125 displays information pertaining to the progress of a source in reviewing, editing or providing feedback for items in the list. Comments from a source may be displayable in a text field 130. Comments may include and are not limited to the source input, or a description of the source input. The list also contains a state field 132 which displays the current state of an item, e.g., Accept, Inspect, or Reject. A source field 134 is also displayable. The source field comprises information relating to the source of the observation e.g., Examiner, Reviewer, or an expert system. The source field displays the origin of an observation made on an item.

FIG. 7 shows that the at least one item of the list may be expanded or explored to display source and supporting data, wherein the source and supporting data further characterize the item. A source can expand analysis results that describe an item by selecting "explore in browser," 150 as described in other embodiments. Analysis results are displayable from the table within a separate window, such as the project browser 60.

The list accepts input as detailed in other embodiments, comprising but not limited to, accepting an item 140, rejecting an item 155, or defining the item as a mixture 145. A source selects an item in the list and is able to provide input, which might cause the analysis results to be modified. The term "selects" refers to a selection made with an input device such as a mouse, trackball, or stylus, as described below. In response to accepting input, an updated list is created. The updated list comprises the modified analysis results characterizing the items that required user input. The updated list is then displayable.

As described above, the expert system can be presented with at least one problem wherein the expert system attempts to resolve the at least one problem. Decisions can be made by the expert system based on a rule base for the at least one problem. The expert system might be applied to all detected fluorescent DNA peaks in at least one experiment of a project. For example, in a C++ implementation, all information related to the at least one experiment can be associated with an object in an object oriented software environment, such as a Run object. In a similar manner, all project information can be associated with the object such as a project object. This application of the expert system creates observations associated with the peaks, which may be stored as C++ Observation objects in a C++ Peak object. The expert system is implemented using rules. Each rule can be thought of as an IF . . . THEN clause, meaning that there is a set of conditions that are tested and must be satisfied (the IF portion), in which case actions are taken (specified in the THEN portion). Each rule has subsequent requirements that are evaluated during the validation process to determine the eventual disposition of a rule's actions. For example, the Stutter Rule (as discussed below) checks to see if the primary peak is a callable allele after all dependency checks have been evaluated. In one embodiment, these actions can create one or more C++ Observations object and associate these objects with other objects such as a peak.

As an example, the expert system's rules are implemented by the C++ runRule ( ) member functions that are associated with each type of observation (class derived from the C++ class Observation). These rules can be grouped into the type of object with which they are associated: specimens, profiles, loci, runs, trace data, and peaks. At various times, according to the stage of execution of the expert system and the type of objects, the conditions associated with these rules are tested for each of their corresponding observations, and the rules are fired (executed) when the conditions match.

This approach is different from that employed by most rule-based expert systems. Usually, a general-purpose execution engine is implemented often using the Rete algorithm (Charles Forgy. Rete: A fast algorithm for the many pattern/many object pattern match problem. *Artificial Intelligence*, 19:17-37, 1982.) and operates upon a separately defined rule base of if-then rules. The constraints of the DNA profile peak fitting application require a different approach, because a tight coupling between functions best implemented in a procedural language (C++) and by a traditional rule base was necessary.

The expert system's rules depend upon, and their operation can be tuned by adjusting a set of parameters that are maintained in a database with each project. The parameters are specified by a C++ AnalysisParams object. These parameters can be easily customized to the needs of each laboratory or site. The expert system's decision processes will change as a function of the selected parameters, and selected values must be carefully chosen using an informed process. Validation of the expert systems' operation using tests with each laboratory's or site's data must also be conducted to ensure that its operation is consistent with the rules defined for that lab or site. The parameters may be modified for the site, or for individual projects, by the person with Administrator privileges using the procedure documented in the Administrator's manual.

FIGS. 7.1 and 7.2 show that a source can change parameters to customize the expert system rule base by accessing analysis properties. For example, a source can change the parameters for "background noise" 156 by setting a "Noise peak amplitude threshold (RFU)" 157, "Noise peak normalized MSE threshold" 158, "Noise peak area threshold (RFU)" 159, and "Noise peak skew threshold (absolute val)" 160. As another example, stutter peak parameters 161 can be changed by setting a "Saturated stutter peak height threshold (% of primary)" 162. These parameters will determine how the rule base of the expert system is applied.

Further, FIGS. 7.3 and 7.4 show that the interactive capabilities of the expert system are modifiable by accessing application properties. For example, parameters such as "remember window layout" 163, "auto save project after data import" 164, "auto save project after analysis" 165, and "auto save interval (minutes)" 166 may be modified according to preference. As discussed above, highlighting may be utilized to draw attention to an item. The parameters that determine which colors are used for highlighting may be altered via application properties. For example, the background color of an item marked for inspection may be set to orange 167, and the text color of an item marked for inspection may be set to black 168. The colors may appear in the indicated color boxes as set.

In a C++ implementation, the expert system's rules are executed from the C++ Specimen, Profile, Run, TraceData, Peak, and Locus classes, according to the type of object being evaluated. When a rule fires (executes), an observation is created and associated with the evaluated object. These observations are usually marked as NOT_VALIDATED; each observation indicates that characteristics of the object indicate a possible conclusion, for example that a peak is a stutter peak, but this must be verified by further automated analysis, and in certain circumstances, user review. After all initial observations are made, the validate( ) methods of the various observations are called to determine whether each observation is VALID NOT_VALID, or AMBIGUOUS (requiring human review). This reconciliation process analyzes all of the observations of a given peak for dependencies on other peaks. All dependencies to an observation associated with a peak are resolved before the peak (and its observations) are validated (marked VALID or NOT_VALID). Validation processes occur throughout the expert system's execution as required by both the initial observations and dependencies among objects. For example, all observations that are initially marked NOT_VALIDATED are evaluated using the validate( ) function for that observation type to attempt a disposition. However, peaks may depend upon the status of other peaks, so invalidation (NOT_VALID status) of a peak may cause invalidation of other peaks. Thus, as the status of objects are changed, other objects must be checked. While most of this discussion pertained to peaks, these processes are equally applicable to other objects and to their classes when implemented in an object-oriented programming language.

The expert system maintains information on dependencies and automatically attempts validation wherever necessary. Once all the dependencies and observations are validated for each peak (or other object), the peak is assigned a type that is associated with the valid observations. (Peaks may have more than one type.) Circular dependencies are possible and are automatically identified by the expert system. When a circular dependency is detected and can not be automatically resolved, a flag is raised that causes notification to the source that manual review, or input, is required. This may be considered marking an item for inspection. Objects at any level of the hierarchy can have a ValidationState, and this state can be VALID only when all objects at lower levels descending from the object have been reconciled. (Note that it is not necessary for all objects to have a VALID state; for example, a peak observation with a NOT-VALID state simply means that observation is not valid and thus does not propagate.) The hierarchy does however, allow the expert system software to attempt validation, or reconciliation, of all objects below a given object in the hierarchy by requesting the validation of that object (and implicitly of all objects below it).

The expert system's rules are grouped according to function. The software design of the DNA peak calling expert system can allow observations to be associated with any object in the system, such as Specimen, Profile, Run, TraceData, Peak, and Locus objects. Within each group, rules are applied to every object of that type.

In this embodiment, by way of example only, a rule base may be applied to classify "stutter peaks." The Stutter Rule examines the relationship between two peaks to determine if one of the peaks is a stutter peak of the other. In this discussion, the peaks will be referred to as Peak 1 and Peak 2. The Stutter Rule is only checked for peak pairs where the location of Peak 1, in base-pairs, is less than the location of Peak 2. At least one of the peaks must be called, and neither peak can be saturated, in order for a stutter observation to be made.

Peak 1 may be classified as a stutter peak only if the difference in the locations of the two peaks is within a specified range (in base-pairs), and if the height of Peak 1 is no more than a specified percentage of the height of Peak 2. This rule defines a region, relative to the main peak (Peak 2) in which Peak 1 must be (e.g., its location and height) in order for a stutter observation to be made. FIG. 7.5 illustrates this relationship between the peaks. The maximum height of the stutter peak is specified as a percentage of the height of the primary peak, Peak 2. The lower and upper bounds on the stutter peak's location, in base-pairs, are specified as an (negative) offset (to the left in the illustration) from the location of the main peak, Peak 2.

The specified range and percentage depend upon the locus of the peaks, so the Stutter Rule first determines this locus. If Peak 1 is a called peak (has a locus and allele assignment), its locus assignment is used; otherwise, the locus assignment of Peak 2 is used. (One of the peaks must be called in order for the Stutter Rule to be executed.)

The difference in the peaks' locations (calculated as the location of Peak 1 less the location of Peak 2 and therefore a negative value) and the peaks' heights are then used in a conditional expression to determine if the rule is to fire and create a stutter observation (a StutterObservation object in the example C++ implementation). The following three inequalities must all be satisfied:

$$\text{diff} >= m\_stutlow$$

$$\text{diff} <= m\_stuthigh$$

$$(\text{Peak 1})_{height} <= m\_stutratio * (\text{Peak 2})_{height}$$

where diff is the (negative) difference in the peaks' locations, m_stutlow is the specified smallest allowed (negative) difference in locations between the stutter peak and its primary peak, m_stuthigh is the specified largest allowed (negative) difference in locations between the stutter peak and its primary peak, and m_stutratio is the maximum specified ratio between the height of a stutter peak and the height of its associated primary peak. These three parameters are specified independently for each locus. The default values of these parameters are determined, first, by the initialization of the database, which occurs in the example C++ implementation of the StrEspApp class in the dbInsertLocusRef ( ) member function, and second by any actions a user (with appropriate privilege) may take to change default values for an analysis kit.

The expert system described in this embodiment has the capability to notify a source to inspect, or enter input, to assist in the expert system decision making process. Based on various observations made by the expert system, the expert system may require additional expertise from a source for at least one problem. Input from a source can trigger the expert system to re-apply the rule base for the at least one problem. By way of example, the at least one problem is whether the DNA peak is a stutter peak or not. Initially, the system, or expert system may make a first decision which classifies a peak as a stutter peak; however, if pre-determined criteria are not met, the system may request user input for assistance in the decision making. If a source disagrees with the system, the source may provide input, which causes the rule base to be re-applied to make a second decision. The second decision might then be different from the first decision.

Rather than re-apply the entire rule base, as applied to the DNA data, one aspect of this embodiment is to only re-apply those portions of the rule base for the at least one problem that would result in a second decision to resolve the at least one problem. For example, if a source rejects an expert system made observation of "stutter peak," the expert system will re-apply only the rule base as applied to stutter peaks, or potential stutter peaks and to objects that depend upon the disposition or decisions involving the stutter peak. It might not re-apply other rule bases for different problems such as noise rule, broad peak rule, spike rule, duplicate allele rule, etc. One method in which this selective re-application of the rule base can be achieved is by analysis of the dependencies among objects. These dependencies, for example, can be represented by a graph, which can be analyzed to determine which rule base needs to be re-applied. The advantage of selective re-application is performance; the software responds much more rapidly to user, or source, actions or input.

FIGS. 8A-8C refer to an additional embodiment which involves a method of displaying and interacting with a collection of data, wherein the data comprise analysis results for the at least one item. A collection of data refers to the data that is being utilized in an analysis. This may include an entire data set, or a fraction thereof. This embodiment includes features of previously described embodiments. It is preferred to have at least one view, or a plurality of views, available to a source, wherein each view may contain the data organized in different ways. This can enhance efficiency and organization by allowing a source to arrange the plurality of views according to preference. For example, a first view (FIG. 8A) (169—project browser) comprises an expandable tree 170 comprising at least one item. The expandable tree is displayable in a vertical frame 175 within a project window. If an item requires input, as potentially determined by an expert system (described above), the item may be highlighted within a table 180. A table within the first view comprises analysis results characterizing the at least one item and are displayable in a main frame 185 adjacent to the vertical frame 175. The table within the first view 190 displays the analysis results characterizing the at least one item responsive to selection within the expandable tree 170. The analysis results displayed in the table 190 are modifiable by input from a source to create an updated table within the first view, wherein the updated table comprises the modified analysis results. The computer system (detailed below) may then display the updated table to the user in the first view 169.

A second view 195 (FIG. 8C) of a portion of the collection of data comprises a table 225 which is organized in tabular form with a vertical column 200 representing the at least one item. The table within the second view 225 displays a plurality of data comprising analysis results 210 characterizing the at least one item, wherein the analysis results of the table are modifiable by input to create an updated table, which comprises the modified analysis results. The updated table is then displayable in the second view 195.

A third view (FIG. 8B) of a portion of the collection of data comprises a list 215. The list contains at least one item that requires user input in addition to analysis results of the at least one item. As described in the above embodiments, the analysis results are modifiable by input to create an updated list. The updated list comprises the modified analysis results which may characterize the at least one item. The updated list is displayable in the third view 220.

It is advantageous to display at least two of the first, second, and third views simultaneously in any possible configuration on a computer screen. Each view may be displayed in a window and each view's location on a screen can be modified by a source. Modifying a view's location on a screen might be done through moving the window via a mouse or with control buttons on a keyboard. The F2 command may cause one view, such as the second view, to move to the front of the display, while the F3 command may cause another view, such as the third view, to move to the front of the display. Any of the F commands located on a standard keyboard might be assigned to any particular view, to enhance user access to a particular view.

In this embodiment, input from a source might be entered from within any one of the plurality of views. Input, as described in the above embodiments, can cause analysis results to be modified, possibly by re-applying an expert system rule base. Further, analysis results can be modified by a source in or from each view. For example, an input from the first view 165 may cause an updated table from the second view 195 and an updated list from a third view 220 to be created. The updated table is displayable in the second view 195, and the updated list is displayed in the third view 220. The input from the first view 169 has not only caused the first view to contain updated analysis results, but also has caused the additional views to contain the updated analysis results. An input from the second view 195 may cause an updated table from the first view and an updated list to be created. The updated table is displayable in the first view 169 and the updated list is displayable in the third view 220. Again, the updated list and the updated table comprise analysis results that have been modified in response to the input. Additionally, input from the third view, may cause an updated table from the first view and an updated table from the second view to be created. An updated table is displayable in the first view 169, and an updated table is displayable in the second view 195. The updated tables comprise analysis results that have been modified in response to the input from the list in the third view 220. The modified results are not only displayable within the view in which the input was accepted, the modified results are displayable in at least one other view as well. This ensures that a source can view and interact with the most accurate, up-to-date data available. Toggling between views allows viewing and interacting with the most up-to-date and accurate data, presented in a plurality of combinations. All of the tables, lists, and information are also displayable to another expert system, or computer system, via a communications interface.

It is advantageous to maintain synchronization and consistency of information in all views. The methods that utilize dependency information in the expert system also provide an advantage by avoiding re-calculation of information or results that do not depend upon data or other information modified on input by a source. The dependency analysis and avoidance of unnecessary re-calculation enables the system to respond rapidly and in a timely manner to changes performed by a source.

An additional aspect of these embodiments begins with importing raw data into a project. As described above, the data is analyzed by an expert system. The expert system makes at least one first observation or decision characterizing the data based on a rule base. Without limitation, an observation or decision will be called a "decision" in the following description. A first source optionally logs into the program and reviews the at least one first decision. The first source can provide a first input to the program that may correspond to the first decision. For example, the first input may indicate agreement or disagreement with the first decision. As a second example, the first input may modify an analysis parameter that requires subsequent re-analysis of data by the expert system. As a third example, the first input may declare that a profile is a mixture and require reanalysis, causing the expert system to make at least one new decision.

The first decision is modifiable as a result of a first input from the first source, either directly by input from the source or indirectly. An example of a direct modification as a result of a first input is a new allele assignment of a peak provided directly by the first source. An example of an indirect modification as a result of a first input is a modification of a peak's classification or any other decision by the expert system as a result of the first input. If necessary, the expert system re-applies the rule base and makes at least one second decision, wherein the second decision is different from the first decision. The second decision is also modifiable as a result of input. A second source optionally logs into the program and reviews the first and/or second decision. A second source can then enter a first input. As described above, possible inputs include, without limitation, acceptance or rejection of the first or second decision indicating agreement or disagreement, respectively, with the input of the first source or the first or second decision. Input from the second source can also provide feedback to the first source or expert system.

In one example, the system may be configured to allow the second source to enter a first input comprising feedback, which might be agreement or disagreement with the decision provided by the expert system and/or first source. In this configuration, only inputs provided by the first source can result in direct or indirect modification of a decision. It is preferable that the expert system utilize input from the second source to determine whether the first and second source are in agreement with each other. In this instance, the system can be configured to enhance the workflow process involving the two sources and system, and can ensure that consensus between the two sources and the system be obtained. For example, agreement can be indicated by input from the first source and agreement with the re-analysis performed by the expert system.

In one embodiment, the first input from the second source might indicate disagreement with the first source and cause the expert system to re-evaluate the rule base and make at least one third decision by modifying the second decision. The third decision might be a direct result of the first input from the second source if the system is configured to allow this behavior. However, in another embodiment, the third decision could be an indirect result of the first input from the second source. In this embodiment, the first source examines the at least one first and/or second decisions, first input from the first source and/or the feedback and first input from the second source, and provides a second input to the system. The expert system then makes at least one third decision by modifying the second decision. Thus, feedback from the second source can indirectly modify the second decision. During this process, the first and second source may optionally choose to examine other information by, for example, examining data maintained by the system that is related to the decisions and/or inputs. The objective of this process is for the first and second sources to reach agreement and for a decision to be made that is consistent with this agreement.

Alternatively, the second source might agree with the first source review and the corresponding first or second decision by, for example, accepting the decision or providing an indication of concurrence in feedback. In any scenario, once consensus has been reached and there is agreement on a decision, the project can be finalized.

In another embodiment, the expert system may be configured to interact with one source. As described above, the source might include an examiner, a reviewer, or another computer system, such as an expert system. In this scenario, the one source has the ability to modify the at least one decision made by the expert system. The source has the ability to cause the expert system to re-evaluate, or re-apply the rule base to make at least one second decision or the source may accept the first decision and finalize the project.

Example Project Flow

Figure 9:
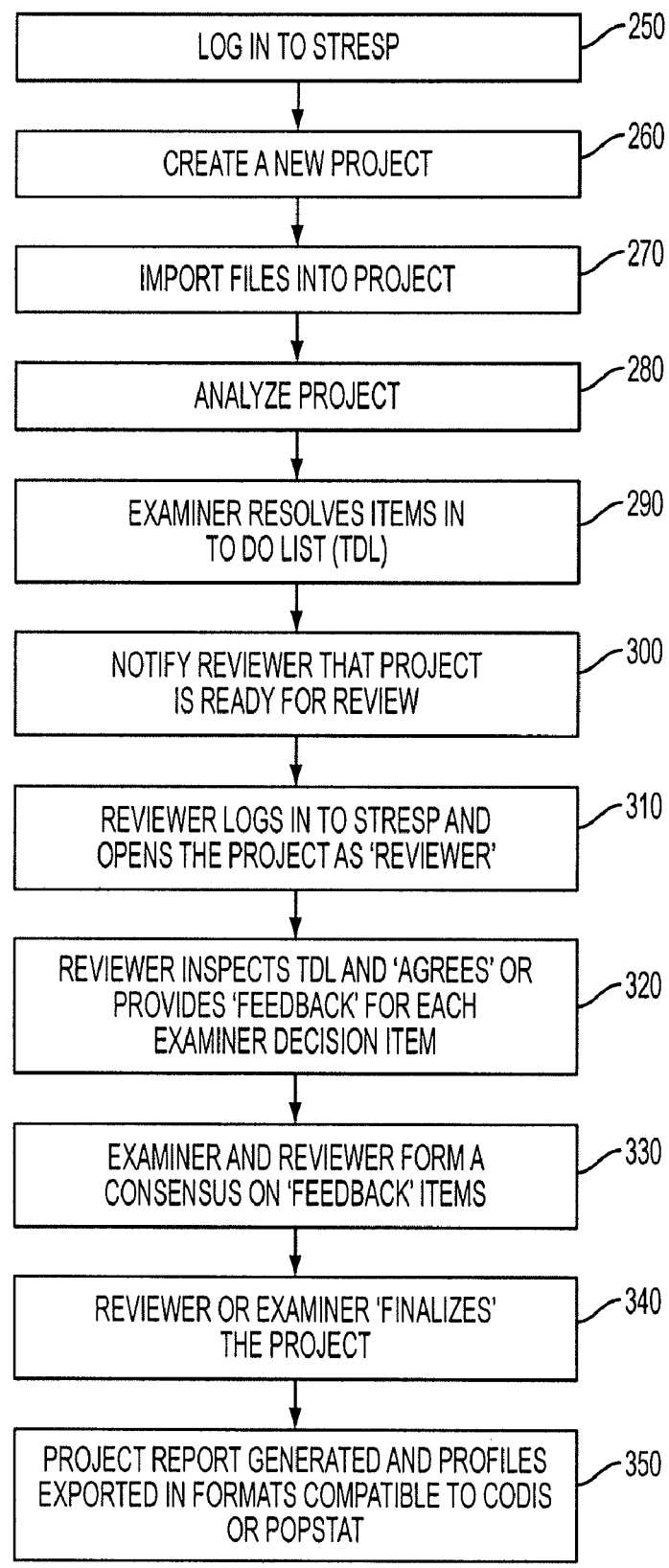
FIG. 9 is a flow diagram representing an example project flow of one embodiment.

One example of possible project flow, as shown in FIG. 9, is discussed below. The user who creates a project and performs the initial analysis and results inspection will be referred to as the examiner and the user who opens the inspected project for review will be referred to as the reviewer. After starting the program, the examiner optionally logs in 250 to have his or her personal privileges and preferences automatically loaded by the DNA profile peak calling expert system. A new project can then be created 260 with a specified name, workgroup, and optionally, a preferred reviewer. Raw capillary electrophoresis DNA files can be imported into the project 270. The examiner may select, for each file, several properties (such as run type, kit, specimen, extraction) if there is no consistent naming convention or information available from other software, such as laboratory information management system (LIMS) otherwise, this information may be obtained from a file name convention or another source such as a LIMS or database. The project is then ready to be analyzed 280. After an automated analysis by the expert system, the examiner resolves items 290 flagged for inspection in the examiner's TDL (To Do List), also referred to as the third view, or the list, by accepting or rejecting the listed items. Observations made by the expert system may also be overridden by the examiner by editing items in the project, but the edited observation will be added to the TDL, also referred to as the third view or the list, for review. Once all items in the TDL have been inspected and resolved, the examiner notifies the reviewer 300 that the project is ready for review. The reviewer then optionally logs in to the expert system program and opens the project as a "reviewer." This implies that the reviewer will review the actions taken by the examiner. The reviewer inspects the reviewer's TDL, also referred to as the third view or the list 320, which now lists the actions taken by the examiner on each item, and "accepts," or provides "feedback" for each examiner decision. The reviewer may also "reject" the examiner's decisions. The reviewer and examiner are to discuss the "feedback" items and form a consensus on the appropriate actions to take 330. Once both the examiner and reviewer agree on actions taken on all of the items listed in the TDL, also referred to as the third view or the list, items the project can be finalized by either user 340. A project is finalized when the sources have accepted a decision. After finalization, projects cannot be modified, but a project can later be de-finalized by either the reviewer or the examiner. Once it is finalized, reports can be generated and profiles exported in a CMF format, importable to either CODIS or POPSTATS, or as a CODIS table for import to CODIS or a compatible LIMS environment 350. In one embodiment, a first source is an examiner and a second source is a reviewer.

Implementation Mechanisms—Hardware Overview

Figure 10:
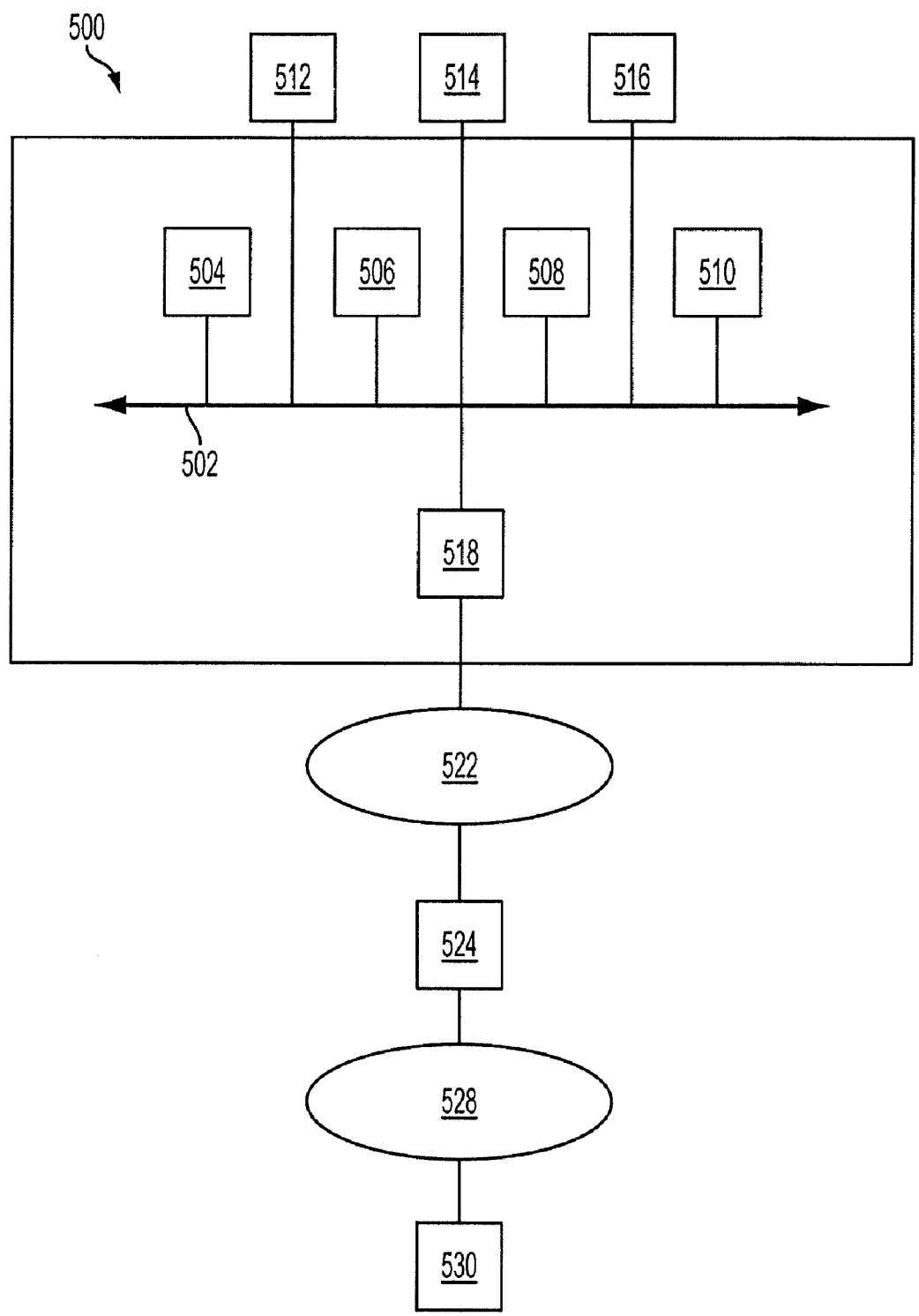
FIG. 10 illustrates a block diagram of a hardware environment that may be used according to an illustrative embodiment of the invention.

Methods of the first embodiment and subsequent embodiments may be utilized in connection with computer readable media, which may be provided for temporary or permanent storage in a personal computer or other computer known in the art. FIG. 10 is a block diagram that illustrates a computer system 500 upon which at least one embodiment of the invention may be implemented. Computer system 500 includes a bus 502 or other communication mechanism for communicating information, and at least one processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 may further include a read only memory ("ROM") 508 or other static storage device coupled to bus 502 for storing static information and instructions for processor 504. A storage device 510, such as a magnetic disk, optical disk, solid-state memory, or the like, may be provided and coupled to bus 502 for storing information and instructions.

Computer system 500 may optionally be coupled via bus 502 to a display 512, such as a cathode ray tube ("CRT"), liquid crystal display ("LCD"), plasma display, television, or the like, for displaying information to a computer user. Alternatively, displayable information may be delivered to a computer user or another computer system or computer program using a communication interface 518. Delivery of information to another computer is also referred to as displaying said information. An input device 514, including alphanumeric and other keys, may be coupled to bus 502 for communicating information and command selections to processor 504. An optional type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Alternatively, information and command selections may be communicated to processor 504 using a communication interface 518. Optionally, separate communication interfaces may be used to deliver information to a computer user or another computer system or computer program, and to communicate information and command selections to processor 504.

The invention is related to the use of computer system 500 for interpreting raw data by an automated system and providing methods of enhanced interaction with an automated system. According to one embodiment of the invention, interpretation of raw data is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. For example, a field-programmable gate array (FPGA) or application-specific integrated circuit (ASIC) may be used. Such a device can, for example, implement associative memory to aid in indexing, search, and retrieval of information stored in a database. Thus, embodiments of the invention are not limited to any specific combination of hardware circuitry and software.

The objects described in this invention, including for example objects corresponding to the C++ classes Peak, Observation, AnalysisParams, TraceData, Locus, Specimen, Profile, and Run, are typically stored in main memory 506. Other data structures may be used in place of these objects, in either an object-oriented or other programming and software execution environment. Optionally, a database, such as MySQL, Oracle, Microsoft SQL Server, or RDB, may be used to store objects or other data structures. In this case, it is advantageous to provide software to serialize and unserialize information stored in objects or other data structure in order to convert the information into and from a form that is more suitable for storage in a database. One example of this conversion is performed in order to preserve links between objects or data structures, which in a representation stored in main memory may be a memory address or pointer, and in a database may be a symbolic reference or other method of reference using, for example, a dictionary or table of symbols. A second example of this conversion is to use a representation of numbers that is not specific to a particular processor 504.

When a database is used to store objects or other data structures, regardless of representation, in addition to objects or data structures stored in main memory, it can be advantageous to separate the functions of database, expert system, and interface (or views) in to two or more parts. In this case, for example, the database or expert system can be implemented or executed on a second processor 504 or computer system 500 in addition to the computer system that implements or executes the interface. The multiple computer systems can communicate and coordinate their activities across any combination of a local area network, a wide area network, or, in a multiprocessor computer, shared memory or other communications channel. In particular, this allows multiple users to simultaneously utilize the expert system or information stored in the database. For example, a client/server configuration with a single database is feasible, which allows a user to access his or her projects from any client computer system. In this case, standard and well-known methods can be utilized to control and coordinate access and enforce consistency across the server and all clients. Such a client/server configuration can utilize user interface technologies such as those discussed elsewhere in this application, or web-enabled interface technologies such as the hypertext markup language (HTML), JavaScript, Java, or a service-oriented architecture (SOA), all of which are well known in the art. In this manner, services can be provided by at least one server over a large geographic area and to one or more organizations. When multiple servers are used, the servers may communicate to possibly share information and coordinate activities, including the ability to distribute workloads across multiple resources.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, solid state memories, and the like, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, solid-state memory, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to processor 504 for execution.

Computer system 500 may also include a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a network card (e.g., and Ethernet card) to provide a data communication connection to a compatible local area network ("LAN") or wide area network ("WAN"), such as the Internet or a private network. Wireless links may also be implemented. In any such implementation, communication interface 518 sends and receives electrical, electromagnetic or optical signals that carry digital data streams representing various types of information. For example, a forensic investigation may require a data communication connection to a database comprising at least DNA profile data or other forensic information.

Network link 520 typically provides data communication through one or more networks to other data devices. For example, network link 520 may provide a connection through local network 522 to a host computer 524 or to data equipment operated by an Internet Service Provider or private network service provider ("ISP"). ISP in turn provides data communication services through a packet data communication network such as the worldwide network commonly referred to as the "Internet" 528 or a private network. An example of a private network is a secure data network linking law enforcement agencies and used for transmission of DNA and/or non-DNA information. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, host computer 524, local network 522 and communication interface 518.

The received code may be executed by processor 504 as it is received, and/or stored in storage device 510, or other tangible computer-readable medium (e.g., non-volatile storage) for later execution. In this manner, computer system 500 may obtain application code and/or data in the form of an intangible computer-readable medium such as a carrier wave, modulated data signal, or other propagated signal.

Computer system 500 can be configured using the methods of this invention to provide services across a network to forensic personnel having client computers capable of connection to the network. These services can also be provided to other software, located in either computer system 500 or a separate computer system connected by a network, network link, or communication interface to computer system 500. The services can be protected using methods of authentication and/or encryption that are known in the fields of computer science and computer security in order to ensure data are neither compromised nor disclosed and to trace all accesses to the data. The computer system 500 and other associated information storage and communication components can be protected using devices and methods that are known in the fields of computer science and computer security, such as with firewalls, physical access controls, power conditioning equipment, and backup or redundant power sources. The information stored by computer system 500 and computer-readable media can be further protected using backup or redundant information storage systems, such as those that are well-known in the art. Examples include tape storage systems and RAID storage arrays.

Thus, there has been shown and described several approaches for organizing and presenting data and methods for interacting with an automated system. Approaches for re-applying an expert system rule base have also been described which might be utilized in concert with the methods for organizing and presenting data. The following set of claims should not be deemed to be limited to the embodiments described above. Alternative embodiments may come to mind to one of ordinary skill in the art for application in alternative or later generation automated systems.

All patents, patent applications, and references cited in this disclosure are expressly incorporated herein by reference.

We claim:

1. A method of organizing and presenting at least one item for specimen DNA, wherein a DNA profile peak calling expert system comprising computer readable media of a computer system, the computer system including an input device, memory, a processor and an output device, has analyzed the at least one item according to a rule base, comprising:
   a. importing DNA electrophoresis data of specimen DNA obtained by a genetic analyzer for analysis by said processor;
   b. displaying a two-dimensional table via said output device, wherein the table displays a plurality of allele locus data comprising analysis results characterizing the at least one item, and wherein an analysis result is based on a decision whether a peak corresponds to a DNA allele made by the expert system via said processor according to the rule base comprising rules for application to objects comprising profile, peak and locus of said DNA electrophoresis data stored in said memory having associated modifiable analysis parameters including a stutter peak parameter of a stutter peak rule;
   c. accepting input from a source comprising one of agreement with the decision, modification of a modifiable analysis parameter, and definition of a profile as a mixture, wherein the input causes the analysis results to be modified, and wherein the results are modified by re-applying the rule base;
   d. in response to the input, creating an updated table, wherein the updated table comprises the modified analysis results; and
   e. displaying the updated table via said output device.

2. The method of claim 1, wherein the table is organized in tabular form with a first vertical column comprising a plurality of labels for at least one item comprising a DNA specimen and a second vertical column representing an item comprising data for said DNA specimen where said second column comprises highlighted allele data for a particular locus if inspection is required.

3. The method of claim 1, wherein the item is expanded to display source of allele locus data and supporting data for said decision, wherein the source and supporting data further characterize an item.

4. The method of claim 3, wherein the expansion comprises displaying at least a third vertical column adjacent to the first and second vertical columns, wherein the third vertical column displays the source data.

5. The method of claim 1, wherein the input further comprises at least one of:
   a. exploring in a browser;
   b. rejecting/flagging the item;
   c. viewing observations;
   d. viewing an audit trail;
   e. defining as a mixture; and
   f. editing a call.

6. The method of claim 1, wherein the input comprises: defining a DNA profile of the item as a mixture.

7. The method of claim 1, wherein at least one analysis result comprising DNA allele information for a DNA locus that requires input is highlighted.

8. The method of claim 7, wherein highlighting comprises at least one of: a color change, labeling as requiring inspection, labeling with a designated symbol, and labeling using a border around the analysis result.

9. The method of claim 1, wherein the analysis results comprise at least four of the following:
   a) status of the item as requiring inspection or satisfying said rule base;
   b) information pertaining to the item;
   c) process information pertaining to the item;
   d) locus information for D3S1358;
   e) locus information for vWA;
   f) locus information for FGA;
   g) locus information for Amelogenin;
   h) locus information for D8S1179;
   i) locus information for D21S11;
   j) locus information for D18S51;
   k) locus information for D5S818;
   l) locus information for D13S317;

m) locus information for D7S820;
n) locus information for D16S539;
o) locus information for TH01;
p) locus information for TPOX; and
q) locus information for CSF1PO.

10. The method of claim 1, wherein input from the source comprises at least input of a reviewer, input of an examiner, or input of another expert system.

11. The method of claim 1, further comprising displaying the table in a window of a screen, the window being moveable via said input device to a different location on said screen.

12. A method of enhancing access to at least one item comprising DNA electrophoresis data of specimen DNA requiring input, wherein a DNA profile peak calling expert system comprising computer readable media of a computer system, the computer system including an input device, memory, a processor and an output device, has analyzed the at least one item according to a rule base, comprising:
   a. compiling a list comprising said at least one item that requires input and analysis results comprising an observation, a status of whether the item requires inspection and a source of the item, the analysis results characterizing the at least one item, wherein an analysis result is based on a decision whether a peak corresponds to a DNA allele made by the expert system according to the rule base comprising peak rules for application to objects comprising profile, peak and locus of said DNA electrophoresis data stored in said memory having associated modifiable analysis parameters including a stutter peak parameter of a stutter peak rule,
   b. displaying the list via said output device,
   c. accepting input from a source comprising one of agreement with the decision, modification of a modifiable analysis parameter, and definition of a profile as a mixture, wherein the input causes the analysis results to be modified, wherein the results are modified by re-applying the rule base via said processor,
   d. in response to accepting input, creating an updated list comprising modified analysis results characterizing the at least one item, and
   e. displaying the updated list via said output device.

13. The method of claim 12, wherein the input further comprises at least one of:
   a. exploring in a browser;
   b. rejecting/flagging the item;
   c. viewing observations;
   d. viewing an audit trail;
   e. defining as a mixture; and
   f. editing a call.

14. The method of claim 12, wherein the input comprises: defining a DNA profile of the item as a mixture.

15. The method of claim 12, wherein the method further comprises displaying comments input via said input device from a source in a text box.

16. The method of claim 12, wherein the item can be expanded to display source identification data or supporting data comprising a number of reviewed observations by a source other than said expert system, wherein the source data or supporting data further characterizes an item.

17. The method of claim 16, wherein the expansion comprises displaying source data or supporting data in a separate window of a screen including a window of said list.

18. The method of claim 12, wherein the list further comprises information describing a current state of the item in a window of a screen including said list.

19. The method of claim 12, wherein the list further comprises information describing an originating source of the item in a window of a screen including said list.

20. The method of claim 12, wherein input from the source comprises at least input of a reviewer, input of an examiner, or input of another expert system.

21. The method of claim 12, further comprising displaying the list in a window of a screen, the window being moveable via said input device to a different location on said screen.

22. The method of claim 21, further comprising displaying the source inspection status within the moveable window.

23. The method of claim 17, wherein the separate window comprises a project browser window overlayable on said list window of said screen.

24. A computer-readable medium storing computer-executable instructions for performing a method of enhancing access to at least one item comprising DNA electrophoresis data of specimen DNA requiring input, wherein a DNA profile peak calling expert system comprising said computer readable medium of a computer system, the computer system including an input device, memory, a processor and an output device, has analyzed the at least one item according to a rule base, comprising:
   a. compiling a list comprising at least one item that requires input and analysis results comprising an observation, a status of whether the item requires inspection and a source of the item, the analysis results characterizing the at least one item, wherein an analysis result is based on a decision whether a peak corresponds to a DNA allele made by the expert system according to the rule base comprising rules for application to objects comprising profile, peak and locus of said DNA electrophoresis data stored in said memory having associated modifiable analysis parameters including a stutter peak parameter of a stutter peak rule,
   b. displaying the list via said output device,
   c. accepting input from a source comprising one of agreement with the decision, modification of a modifiable analysis parameter, and definition of a profile as a mixture, wherein the input causes the analysis results to be modified, wherein the results are modified by re-applying the rule base via said processor,
   d. in response to accepting input, creating an updated list comprising modified analysis results characterizing the at least one item, and
   e. displaying the updated list via said output device.

25. The computer-readable medium of claim 24, wherein the input further comprises at least one of:
   a. exploring in a browser;
   b. rejecting/flagging the item;
   c. viewing observations;
   d. viewing an audit trail;
   e. defining as a mixture; and
   f. editing the call.

26. The computer-readable medium of claim 24, wherein the input comprises:
   defining a DNA profile of the item as a mixture.

27. The computer-readable medium of claim 24, wherein the item can be expanded to display source data of allele locus data or supporting data for said decision, wherein the source data or supporting data further characterizes an item.

28. The computer-readable medium of claim 27, wherein the expansion comprises displaying source data or supporting data in a separate window of a screen.

29. The computer-readable medium of claim 24, wherein input from the source comprises at least input of a reviewer, input of an examiner, or input of another expert system.

30. The method of claim 1, wherein said stutter peak rule comprises three inequalities, a first inequality related to a smallest allowed difference in location between a stutter peak and an associated primary peak, to a largest allowed difference in location between a stutter peak and the associated primary peak and to said modifiable stutter peak parameter being a modifiable percent of stutter peak height to a height of the associated primary peak.

31. The method of claim 12, wherein said stutter peak rule comprises three inequalities, a first inequality related to a smallest allowed difference in location between a stutter peak and an associated primary peak, to a largest allowed difference in location between a stutter peak and the associated primary peak and to said modifiable stutter peak parameter being a modifiable percent of stutter peak height to a height of the associated primary peak.

32. The computer-readable medium of claim 24, wherein said stutter peak rule comprises three inequalities, a first inequality related to a smallest allowed difference in location between a stutter peak and an associated primary peak, to a largest allowed difference in location between a stutter peak and the associated primary peak and to said modifiable stutter peak parameter being a modifiable percent of stutter peak height to a height of the associated primary peak.

* * * * *

UNITED STATES PATENT AND TRADEMARK OFFICE
CERTIFICATE OF CORRECTION

PATENT NO. : 7,640,223 B2
APPLICATION NO. : 11/560566
DATED : December 29, 2009
INVENTOR(S) : Birdwell et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this

Ninth Day of November, 2010

David J. Kappos
*Director of the United States Patent and Trademark Office*